US012212502B2

(12) United States Patent
Debbage et al.

(10) Patent No.: US 12,212,502 B2
(45) Date of Patent: Jan. 28, 2025

(54) RELIABLE TRANSPORT ARCHITECTURE

(71) Applicant: Intel Corporation, Santa Clara, CA (US)

(72) Inventors: Mark Debbage, Santa Clara, CA (US); Robert Southworth, Chatsworth, CA (US); Arvind Srinivasan, San Jose, CA (US); Cheolmin Park, Shrewsbury, MA (US); Todd Rimmer, Exton, PA (US); Brian S. Hausauer, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 235 days.

(21) Appl. No.: 17/084,526

(22) Filed: Oct. 29, 2020

(65) Prior Publication Data

US 2021/0119930 A1 Apr. 22, 2021

Related U.S. Application Data

(60) Provisional application No. 62/929,001, filed on Oct. 31, 2019.

(51) Int. Cl.
*H04L 47/34* (2022.01)
*H04L 1/1607* (2023.01)
*H04L 47/125* (2022.01)

(52) U.S. Cl.
CPC ............ *H04L 47/34* (2013.01); *H04L 1/1642* (2013.01); *H04L 47/125* (2013.01)

(58) Field of Classification Search
CPC ..... H04L 47/34; H04L 1/1642; H04L 47/125; H04L 45/24; H04L 1/1621
See application file for complete search history.

(56) References Cited

U.S. PATENT DOCUMENTS

2010/0046519 A1* 2/2010 Dan .................... H04L 49/9094
370/394
2010/0189112 A1* 7/2010 Nakata .................... H04L 47/50
370/400

(Continued)

OTHER PUBLICATIONS

Chen et al. (Multi-Path Transport for RDMA in Datacenters, The Proceedings of the 15th USENIX Symposium on Networked Systems Design and Implementation, Apr. 9-11, 2018. Renton, USA.) (Year: 2018).*

(Continued)

*Primary Examiner* — Harry H Kim
*Assistant Examiner* — Mohammed M Murshid
(74) *Attorney, Agent, or Firm* — Compass IP Law PC

(57) ABSTRACT

Examples described herein relate to technologies for reliable packet transmission. In some examples, a network interface includes circuitry to: receive a request to transmit a packet to a destination device, select a path for the packet, provide a path identifier identifying one of multiple paths from the network interface to a destination and Path Sequence Number (PSN) for the packet, wherein the PSN is to identify a packet transmission order over the selected path, include the PSN in the packet, and transmit the packet. In some examples, if the packet is a re-transmit of a previously transmitted packet, the circuitry is to: select a path for the re-transmit packet, and set a PSN of the re-transmit packet that is a current packet transmission number for the selected path for the re-transmit packet. In some examples, a network interface includes circuitry to process a received packet to at least determine a Path Sequence Number (PSN) for the received packet, wherein the PSN is to provide an order of packet transmissions for a path associated with the received packet, process a second received packet to at least determine its PSN, and based on the PSN of the second received packet not being a next sequential value after the PSN of the (Continued)

received packet, cause transmission of a re-transmit request to a sender of the packet and the second packet.

19 Claims, 16 Drawing Sheets

(56) References Cited

U.S. PATENT DOCUMENTS

| | | | | |
|---|---|---|---|---|
| 2012/0227088 | A1* | 9/2012 | Gao | H04L 63/1458 726/3 |
| 2013/0060885 | A1* | 3/2013 | Fu | G06F 16/9574 709/217 |
| 2014/0226663 | A1* | 8/2014 | Chan | H04L 45/741 370/392 |
| 2014/0269691 | A1* | 9/2014 | Xue | H04L 45/38 370/392 |
| 2017/0311204 | A1* | 10/2017 | Cariou | H04W 28/085 |
| 2017/0359268 | A1* | 12/2017 | Chan | H04L 1/08 |
| 2018/0351648 | A1* | 12/2018 | Hyakudai | H04B 10/50 |
| 2019/0104206 | A1* | 4/2019 | Goel | H04L 45/42 |
| 2019/0173789 | A1* | 6/2019 | Shalev | H04L 45/745 |
| 2020/0213246 | A1* | 7/2020 | Pan | G06F 15/17331 |
| 2021/0067457 | A1* | 3/2021 | Wang | H04L 43/106 |
| 2022/0232074 | A1* | 7/2022 | Scaglione | H04L 69/18 |

OTHER PUBLICATIONS

Lacurts, Katrina, "Basic Reliable Transport Protocols", Jun. 2018, 8 pages.

Li, Yuliang, et al., "HPCC: High Precision Congestion Control", 2019 Association for Computing Machinery, SIGCOMM '19, Aug. 19-23, 2019, Beijing, China, 15 pages.

Blog of Fiber Transceivers, InfiniBand Tutorial: What's It and How It Works?, https://www.fiber-optic-transceiver-module.com/things-you-should-know-about-infiniband.html, Posted Aug. 10, 2017, 4 pages.

Kim, John et al., "*RoCE* vs. *iWARP*—A Great Storage Debate", SNIA EFS, Ethernet Storage, Live Webcast, Aug. 22, 2018, 35 pages.

* cited by examiner

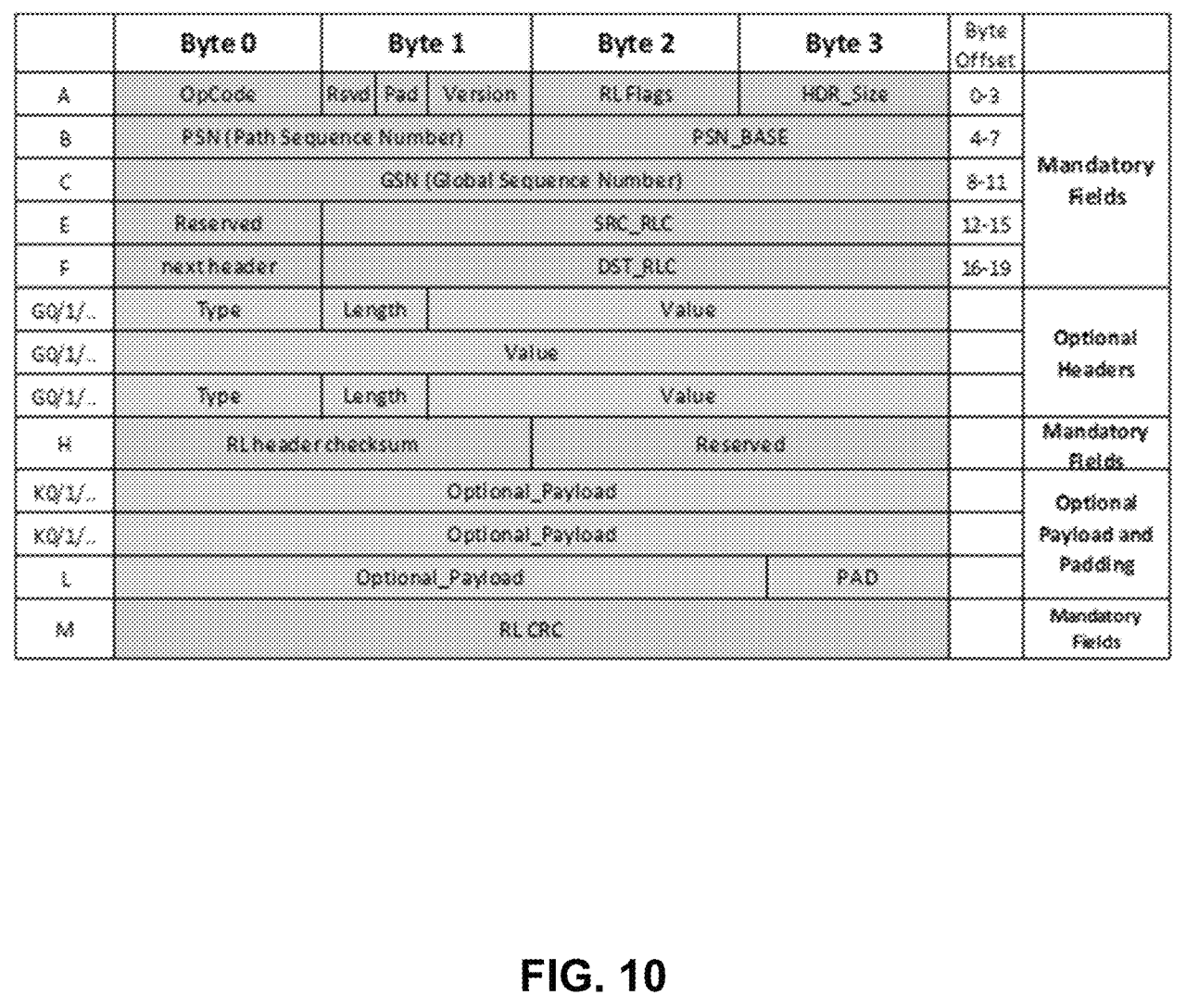

|   | Byte 0 | Byte 1 | Byte 2 | Byte 3 | Byte Offset | |
|---|---|---|---|---|---|---|
| A | OpCode | Rsvd Pad Version | RL Flags | HDR_Size | 0-3 | Mandatory Fields |
| B | PSN (Path Sequence Number) | | | PSN_BASE | 4-7 | |
| C | GSN (Global Sequence Number) | | | | 8-11 | |
| E | Reserved | | SRC_RLC | | 12-15 | |
| F | NxtHeader | | DST_RLC | | 16-19 | |
| G0/1/.. | Type | Length | Value | | | Optional Headers |
| G0/1/.. | | | Value | | | |
| G0/1/.. | Type | Length | Value | | | |
| H | RL Header checksum | | Reserved | | | Mandatory Fields |
| K0/1/.. | Optional_Payload | | | | | Optional Payload and Padding |
| K0/1/.. | Optional_Payload | | | | | |
| L | Optional_Payload | | | PAD | | |
| M | RL CRC | | | | | Mandatory Fields |

FIG. 10

RELIABLE TRANSPORT ARCHITECTURE

RELATED APPLICATION

This application claims the benefit of priority of U.S. Provisional application 62/929,001, filed Oct. 31, 2019. The contents of that application is incorporated in its entirety herein.

DESCRIPTION

Packets transmitted over a network or fabric can experience indeterminate latency and/or congestion that can lead to packets being received later than expected, out-of-order, or not being received. A variety of reliable transport mechanisms are used to reduce loads on networks and reduce latency associated with retransmission of lost packets.

BRIEF DESCRIPTION OF THE DRAWINGS

FIG. 10 depicts an example RL packet format.

DETAILED DESCRIPTION

Figure 1:
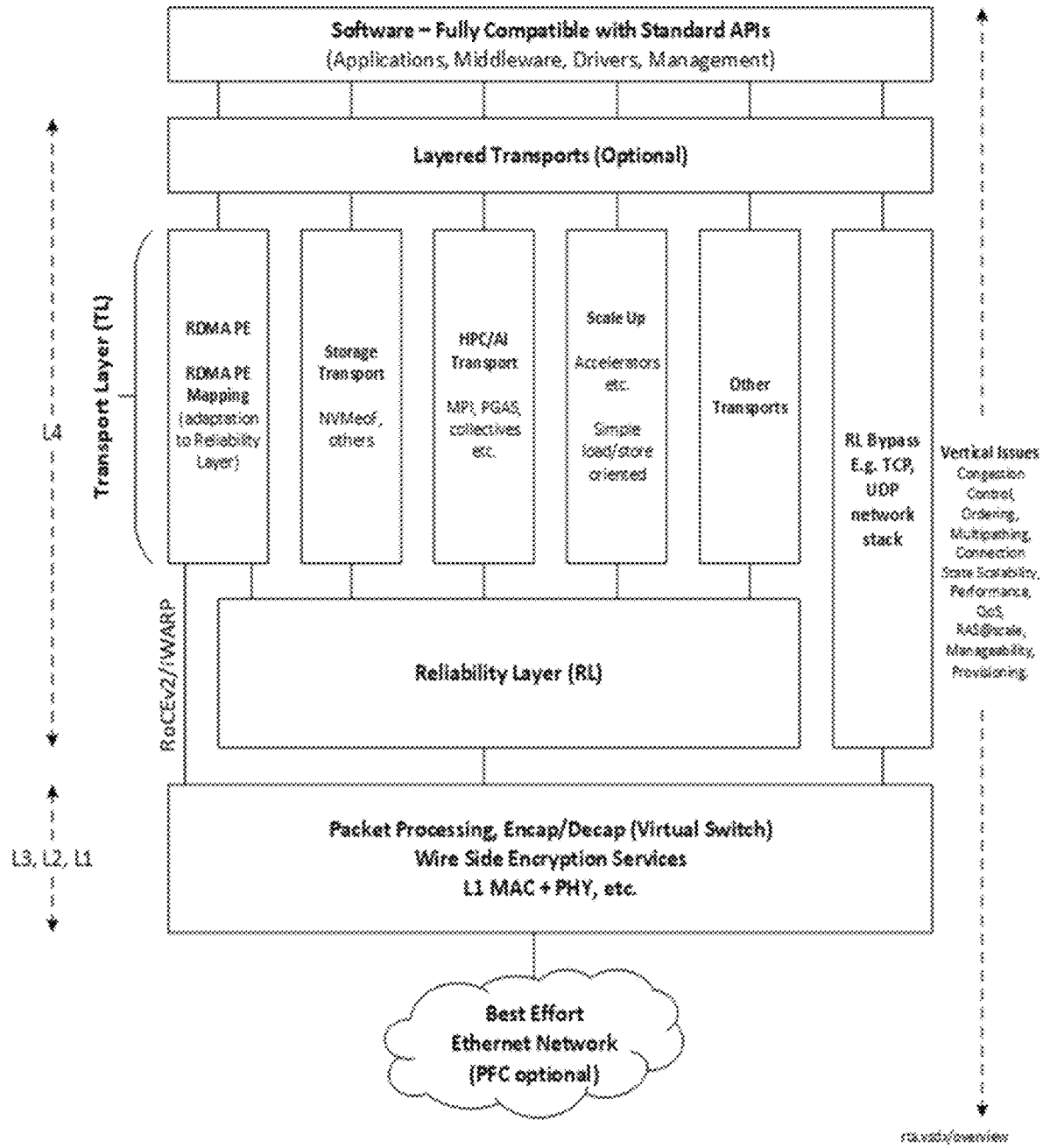
FIG. 1 depicts an example system.

The following provides an example glossary of various terms used herein.

| Term | Non-limiting example |
|------|----------------------|
| CCS | Congestion Control Sublayer |
| GSN | Global Sequence Number |
| LL | Lower Layer-this can represent the layer underneath the Reliability Layer. |
| MRS | Multipath Reliability Sublayer |
| NBMP | NIC-Based Per-Packet Multipath-delivering the packets of a single flow using multiple paths through the network with adaptive per-packet path selection performed by the sending NIC |
| ODM | Ordered Delivery Mode-packets sent on an RLC are guaranteed to be delivered reliably by the RL in the original send order to the receiver. |
| PPD | Packet Pipelining Depth |
| PPMP | Per-packet Multipath-delivering the packets of a single flow using multiple paths through the network |
| PLR | Packet Loss Rate |
| PRB | Packet Reorder Buffer |
| PSN | Path Sequence Number |
| RL | Reliability Layer |
| RLC | Reliability Layer Connection-this can be a bidirectional connection at the Reliability Layer formed between two nodes for the reliable communication of packets. |
| RTA | Reliability Transport Architecture |
| SBMP | Switch-Based Per-Packet Multipath-delivering the packets of a single flow using multiple paths through the network with adaptive per-packet routing decisions being made by the switch |
| TL | Transport Layer |
| TLC | Transport Layer Connection-this can be a connection at the Transport Layer. Transport Layers provide a connected service to higher layers. An example is the Reliable Connected service provided to Queue Pairs in the RoCEv2 specification. |
| UDM | Unordered Delivery Mode-packets sent on an RLC are delivered reliably by the RL in any possible, legal reordering to the receiver. |
| ACK | Acknowledgement |
| AI | Artificial Intelligence |
| BDP | Bandwidth Delay Product (results from Little's Law) |
| BECN | Backwards Explicit Congestion Notification |
| BTH | Base Transport Header (defined by InfiniBand Architecture (IBA) (e.g., InfiniBand Trade Association. InfiniBand Architecture Specification: Release 1.0. 2000 and variations, predecessors, and modifications thereof) |
| BW | Bandwidth |
| CC | Congestion Control |
| CNP | Congestion Notification Packet |
| CQE | Completion Queue Entry-In the Open Fabrics Verbs API and entry in a completion queue which indicates a previously requested send or receive has completed. |
| CRC | Cyclic Redundancy Check |
| DCQCN | Data Center Quantized Congestion Notification |
| DL | Deep Learning-a form of AI which focuses on neural networks capable of learning from unstructured data |
| DSA | Data Streaming Architecture-CPU feature which permits automated memory to memory or PCIe to/from memory transfers without CPU copy loops |
| E2E | End-to-end |
| ECC | Error Correction Code |
| ECN | Explicit Congestion Notification |
| ECMP | Equal-cost Multipath Routing-delivering the packets of multiple flows using multiple paths through the network while maintaining packet order on a per-flow basis |
| ETH | Extended Transport Header (defined by IBA) |
| EWMA | Exponentially Weighted Moving Average |
| FEC | Forward Error Correction |
| FECN | Forwards Explicit Congestion Notification |
| FGAR | Fine-grained Adaptive Routing |
| GPU | Graphics Processing Unit |
| HoL | Head-of-line (as in Head-of-line blocking) |
| HPC | High Performance Computing-a set of applications and solutions which seek to offer computational performance far exceeding that of a single CPU, GPU or server. |
| HPCC | High Precision Congestion Control. See, e.g., Li et al. "HPCC: High Precision Congestion Control" (2019). |

| Term | Non-limiting example |
| --- | --- |
| IANA | Internet Assigned Numbers Authority |
| IBA | InfiniBand Architecture |
| IBTA | InfiniBand Trade Association |
| IEEE | Institute of Electrical and Electronic Engineers |
| IETF | Internet Engineering Task Force (standards organization) |
| INT | In-band Network Telemetry |
| ISO | International Organization for Standardization |
| iWARP | iWARP is a computer networking protocol that implements Remote Direct Memory Access (RDMA) for efficient data transfer over Internet Protocol networks. iWARP is not an acronym for Internet Wide Area RDMA Protocol. |
| MGAR | Medium-grained Adaptive Routing |
| MLSL | Intel Machine Learning Scaling Library |
| MPI | Message Passing Interface. A popular standardized API used in many HPC clusters |
| MPI Communicator | An application specified set of processes within an MPI job |
| MPI | Rank A zero-based integer value to identify a process within an MPI communicator-used to identify source and destination process for MPI message passing |
| MPPS | Million Packets Per Second |
| NACK | Negative Acknowledgement |
| NIC | Network Interface Controller or Network Interface Card (whether discrete or part of a system on chip (SoC) |
| NTB | Non-transparent Bridging |
| OOO | Out of Order-modified from the original order |
| OSI | Open Systems Interconnection |
| PCI | Peripheral Component Interconnect |
| PCIe | PCI Express (e.g., described in PCI Express Base Specification 1.0 (2002) and predecessors and modifications thereof) |
| PE | Protocol Engine |
| PFC | Priority Flow Control |
| PGAS | Partitioned Global Address Space-a programming model where each node in an HPC cluster contributes some memory to a global address space and then individual nodes may all freely get (read) and put (write) data into the global address space as a form of distributed shared global memory. |
| QP | Queue Pair (defined by IBA) |
| RAS | Reliability, Availability, Serviceability |
| RC | Reliable Connected, one kind of communication service provided by a QP (defined by IBA) |
| RD | Reliable Datagram, one kind of communication service provided by a QP (defined by IBA) |
| RDMA | Remote Direct Memory Access |
| RFC | Request For Comment |
| RoCE | RDMA over Converged Ethernet version 1-see specification published by the InfiniBand Trade Association. This is the InfiniBand transport layered over Ethernet L2 routing. |
| RoCEv2 | RDMA over Converged Ethernet version 2-see specification published by the InfiniBand Trade Association. This is the InfiniBand transport layered over IP L3 routing. |
| RTO | Retransmission Time Out |
| RTT | Round Trip Time |
| SACK | Selective Acknowledgement |
| SDN | Software Defined Networking |
| SECDED | Single Error Correction, Double Error Detection |
| TCP | Transmission Control Protocol |
| Training | A process in AI/DL where a neural network is repeatedly given a series of labeled unstructured data and iteratively adjusts its network parameters and weights to improve the accuracy of the neural networks answers for the domain of the provided unstructured data. |
| UC | Unreliable Connected, one kind of communication service provided by a QP (defined by IBA)-generally uninteresting since the implementation cost is relatively similar to RC |
| UD | Unreliable Datagram, one kind of communication service provided by a QP (defined by IBA)-the InfiniBand equivalent to UDP |
| UDP | User Datagram Protocol (see IETF RFC 768) |
| UPI | Ultra Path Interconnect-low-latency, coherent interface between processors |
| WCMP | Weighted Cost Multipath Routing |
| XPU | Processing Unit such as a CPU, GPU, or programmable or fixed-function accelerator. |

FIG. 1 depicts an example of a Reliable Transport Architecture (RTA). RTA can include a Reliability Layer (RL) and various Transport Layers (TL). RTA provides a framework to allow for one or more Transport Layers (TL) to be instantiated above the RL. RL can manage end-to-end reliability issues so that the TL can be focused on transport layer properties such as operation semantics and the interface to higher layers.

RTA can provide a framework for constructing high-performance transports over a common reliability layer. RTA can be used for RDMA, HPC/AI (tightly coupled computation), storage (including FLASH and 3D Xpoint), and any potentially scale-up communication with the robustness for cloud-scale network infrastructure.

Various embodiments of the Reliability Layer (RL) provide end-to-end reliable communication across a best-effort Ethernet fabric. RL can provide low latency, high bandwidth and high packet rate. In some examples, IEEE or IETF developed Data Center Bridging (DCB) is not used and reasonable rates of packet loss are tolerated through an end-to-end reliability protocol. Priority Flow Control (PFC) may be optionally enabled in some configurations but can be disabled to avoid congestion trees and congestion collapse. RL can take advantage of NIC-based multipath routing and advanced congestion control.

Standard networking stacks based on TCP and/or UDP can be a parallel transport that bypasses RL. Industry-standard, inter-operable RoCEv2 and iWARP are supported by the remote direct memory access (RDMA) Protocol Engine and also can bypass RL. In some examples, RL and TL can both reside at L4 (Transport layer) in the OSI reference model.

Standards-compliant/inter-operable paths are provided at least for RDMA over Converged Ethernet (RoCE), RoCEv2, iWARP and TCP transports. Communications can be provided using one or more of: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), Infinity Fabric (IF), 3GPP Long Term Evolution (LTE) (4G), 3GPP 5G, and variations thereof. In some examples, data can be copied or stored to virtualized storage nodes using protocols such as Non-Volatile Memory Express (NVMe) or NVMe over fabrics (NVMe-oF) (or iSCSI storage command generation). For example, NVMe-oF is described at least in NVM Express, Inc., "NVM Express Over Fabrics," Revision 1.0, Jun. 5, 2016, and specifications referenced therein and variations and revisions thereof.

RTA can be implemented as a highly-configurable IP block that can be used in a system on chip (SOC) design methodology as a layered component in various networking products such as one or more of: network interface card or controller (NIC), Smart NIC, HPC/AI compatible NIC, storage initiator or storage target, accelerator interconnection fabric, CXL interconnection fabric, and so forth.

Flexibility, configurability and scalability can be supported by separation of RTA into layers; reduction of RTA feature set that provide a sufficient set of building blocks for TLs with no need to duplicate TL capabilities, and RTA is not a union of the possible TL feature lists; modification of connection state through connection multiplexing; or the separation of potentially large data structures, such as buffers and state tracking, so that they can be appropriately scaled to meet product-specific requirements.

RTA can address performance shortcomings of the RoCEv2 protocol when using a best-effort Ethernet network. These problems may be due to RDMA's use of a go-back-N mechanism for loss recovery, where occasional packet drops can lead to severe loss of end-to-end goodput. PFC is often turned on to provide a lossless network and enhance RoCEv2's performance. However, this solution often leads to head-of-line blocking, congestion spreading and deadlocks. Hence, an alternative reliable RDMA transport is needed to remove the reliance of RoCEv2 on PFC.

Various embodiments can maintain compatibility with the Verbs and OFI APIs so that the existing software investment in middleware and applications can be leveraged. To a first approximation, the workloads of interest are those supported by the Verbs and OFI APIs.

RTA can provide a wire-side protocol not encumbered by RoCEv2/iWARP standards: Wire-side inter-operability with RoCEv2 and iWARP is a base feature of the existing RDMA Protocol Engine (PE) implementation, and RTA does not need to duplicate this capability. This allows RTA to innovate in its capabilities and wire formats. The mechanisms used to negotiate, activate and connect RTA capabilities, rather than the standard RoCEv2/iWARP capabilities, can be defined in a future release of this specification.

RTA can be used at least for storage (e.g., NVMe-oF, etc.), High Performance Computing/Artificial Intelligence (e.g., MPI, PGAS, collectives, etc.), scale up (e.g., accelerators), or other future transport opportunities to be identified.

Figure 2:
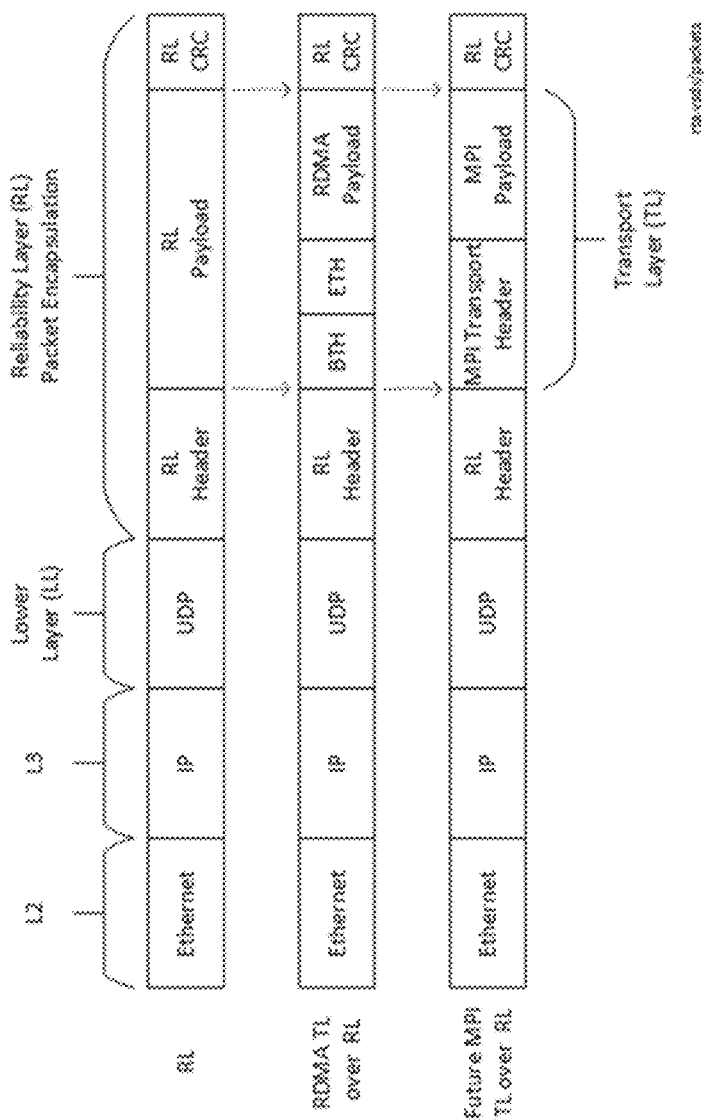
FIG. 2 depicts an example of a Reliability Transport Architecture (RTA) packet format.

FIG. 2 depicts an example of an RTA packet format. RTA packets can be transmitted as standard UDP packets using a well-known destination port number. There are many ways in which UDP packets can be encapsulated on a fabric, such as but not limited to: encapsulation as Ethernet frames, optionally with 802.1Q VLAN tagging, followed by IPv4 or IPv6 layer 3 addressing; use of tunneling protocols to further encapsulate the Ethernet frame or IP packet (e.g., VXLAN, NVGRE, etc.); or use of security encapsulations to encrypt/decrypt packets on the wire side (e.g., IPsec, etc.).

Ethernet framing details are not shown in FIG. 2 but can include a preamble, start of frame delimiter, frame check sequence and inter-packet gap per IEEE 802.3 standards-based Ethernet.

In a UDP packet header, a source port can be used to support multipaths. A destination port can be used to identify RL packets using a well-known port number. Length can indicate the length in bytes of the UDP header and UDP data. Checksum can be used for error-checking of the header and data, in IPv4 and in IPv6.

RL packet encapsulation can use a structure with RL header, RL Payload, and RL CRC. A RL Header can include a header prepended to an RL packet. A RL Payload can include a payload associated with an RL packet. RL CRC can include a 32-bit invariant CRC appended after the payload and can provide end-to-end data integrity protection where the ends are loosely defined as the RL on the sending side through to the RL on the receiving side. Additional overlapping data integrity methods can be used to promote end-to-end data integrity up to the TL and beyond. The RL CRC is invariant from RL send side to RL receive side so that the switch does not modify any field covered by RL CRC (excepting corruption cases). In some cases, the switch will neither validate nor regenerate the RL CRC.

FIG. 2 also illustrates two TL examples as an RDMA TL layered over RL and MPI TL layered directly over RL, namely, RDMA TL layered over RL and MPI TL layered directly over RL. In RDMA TL layered over RL, RDMA refers generically to the capabilities defined by the Transport Layer chapter of the InfiniBand Architecture Specification. BTH represents the Base Transport Header, ETH represents the Extended Transport Header and "RDMA payload" represents the payload.

MPI TL layered directly over RL provides an MPI Transport Header and an MPI Payload with the details to be specified by some future 1VIPI transport that is to run directly over RL rather than layered over some other TL (like the RDMA TL).

Layering

There can be a separation between TL and RL responsibilities. RL can be packet-oriented and does not provide message fragmentation nor reassembly. The message concept can be deferred to the TL. There may be some options to provide message-level hints to the RL, such as a last packet indicator. RL may not be aware of TL operation semantics such as send/receive, RDMA read/write, get/put, atomics or collectives. RL may have visibility of the packet streams that result from these operations. RL may not distinguish TL requests and TL responses. These are all packets at the RL.

Where a packet representing a TL request is received, executed by the TL, and turned around into a TL response, the RL may make no association between the incoming and outgoing packets (even though they are part of the same TL operation). The RL can be transparent to protocol deadlock avoidance as deadlock avoidance can be handled at the TL. RL can opportunistically piggy-back RL ACKs onto TL packets in the reverse direction on the same Reliability Layer Connection. In high packet rate scenarios this can hide the packet rate impact of RL ACKs.

Connections

RL can provide connections that are used to implement reliable communications between two nodes. These are called Reliability Layer Connections (RLC). Many transports also provide a connected service and these transports are referred to generically as Transport Layer Connections (TLC) to differentiate from RLCs.

One RLC instance can connect two nodes A and B in both directions. For A to B, Node A sends packets that are received by node B and Node B sends acknowledgements that are received by node A. For B to A, Node B sends packets that are received by node A and Node A sends acknowledgements that are received by node B.

The RLC primitive can support both directions for the following reasons. Most use cases are inherently bidirectional (e.g., request/response idiom at transport or application level). This allows for a piggy-backed acknowledgement adjustments where acknowledgements can "hitch a ride" on packets traveling in the complementary direction to reduce the packet rate load due to acknowledgements.

Figure 3:
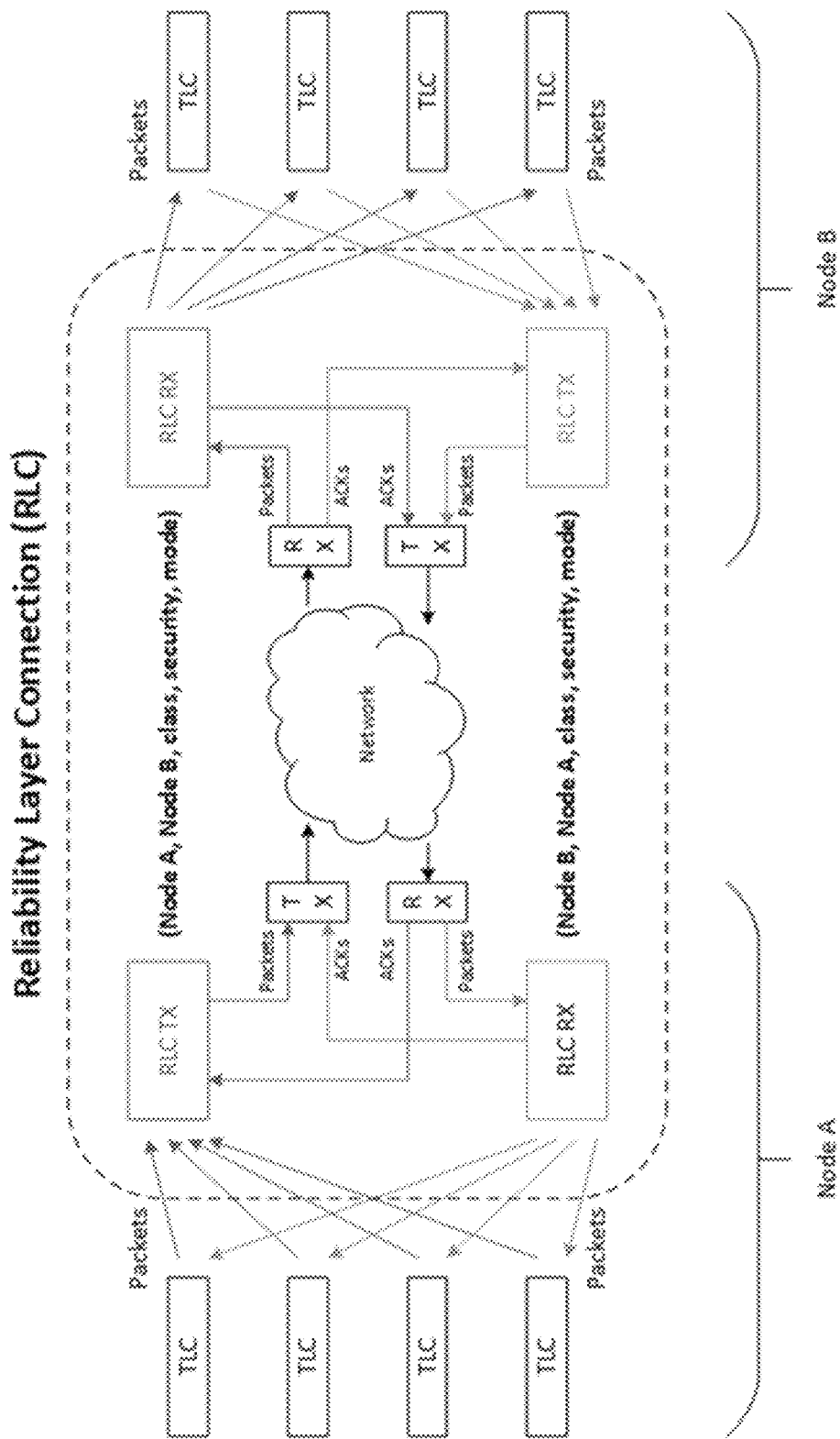
FIG. 3 shows an example Reliability Layer Connection (RLC).

FIG. 3 shows an example Reliability Layer Connection (RLC) that supports TLCs. There is a packet flow direction from Node A to Node B and a flow direction from Node B to Node A. Multipathing capability can be provided in the network bubble. Various embodiments support one or more RLCs to provide simultaneous connections to multiple nodes. Multiple RLCs can be configured between a pair of nodes to separate packet streams in order to support different classes of services. For example, it may be desirable to support up to 8 different classes of services to match the 8 traffic classes supported by 802.1Q tagging. Multiple RLCs can support separate security domains to ensure that communication channels in different security domains are differentiated and separated or different delivery modes for specifically ordered delivery and unordered delivery modes.

Some embodiments can support many RLC instances up to an implementation-defined limit. The following tuple notation can specify the connection: (this_node, peer_node, class, security, mode), where:
 this_node: an identifier representing this node;
 peer_node: an identifier representing the peer node that is connected to by this RLC;
 class: an identifier representing the class of service (e.g., traffic class for QoS);
 security: an identifier representing the security domain; and
 mode: an identifier differentiating ordered and unordered delivery modes.

An RLC can be connected between two nodes to send/receive packets, and then it is disconnected when the service is not used. Examples choices for the 5 parameters in the above tuple are specified when the RLC TX and RLC RX end-points are created and the same choices are used for both directions of the RLC.

An RLC can support multiple independent packet streams from TL clients. This is called Connection Multiplexing and allows for significant connection state reduction for workloads that use large numbers of connections.

Reliability

Some systems can use end-to-end reliability from the memory that holds the original source data at the sender through to the memory that holds the final destination data at the receiver. The system architecture is broken down into multiple reliability domains where different reliability strategies are employed. Examples include the host processor, host memory, PCIe, the NIC, the Ethernet link, and the network switches. There may be overlapping of reliability protection to cover the boundaries, and layered end-to-end protection to give additional coverage for the full end-to-end path. Aspects of reliability include ensuring that all packets are delivered correctly and that packet data integrity is preserved. Packet loss or packet data corruption can result in retries, and many such errors can be detected and corrected without application visibility. Performance impacts can also be mitigated through various strategies. Detected but uncorrectable errors need to be reported in appropriate ways (e.g., error codes, interrupts/traps, counters), with higher layer schemes for their appropriate handling. The risk of silent data corruption is reduced to very small rates that are acceptable to the systems architecture through standard techniques such as CRC, ECC, FEC and other protection codes. Of course, at very large scale in hyperscale data centers there is significant sensitivity to these error rates.

Multipathing

Multipathing allows multiple paths to be exploited between a sending node and a receiving node to allow spreading of traffic across multiple switch fabric paths to give better load balancing and better avoidance of congestion hot-spots. There are many possible schemes including Equal-cost Multipath Routing (ECMP) and Weighted Cost Multipath Routing (WCMP).

RTA uses NIC-Based Per-packet Multipath (NBMP) where packets from a single RLC may use multiple paths through the network with per-packet path selection performed by the sending NIC. This approach may deliver better protocol efficiency in the presence of non-negligible packet loss which is typical for best-effort networks. Packet loss can be detected on a per-path basis since subsequent packets on a path can be used to detect sequence gaps in prior packets on that same path. This forms the basis for a selective ACK (or ack) and retry protocol where the retried packets are based on the set of missing packets at the receiver. This is in contrast to the standard go-back N reliability protocol which retries all packets after the last in sequence packet.

Retry can be initiated, where possible, based on a NACK or SACK indication (incurring an RTT delay). This can lead to significantly faster retry than a send side time-out mechanism which incurs a more expensive RTO delay. Various embodiments of RTA reliability layer uses a two-level sequence number scheme where each path and each RLC are sequenced numbered independently to support this feature.

RTA may not support Switch-Based Per-packet Multipath (SBMP) where the switch performs per-packet path selection (also known as fine-grained adaptive routing or FGAR). With this approach each packet can take a different path through the switching fabric, unknown to the sending NIC. This means that packet drops cannot generally be inferred from out-of-sequence delivery leading to a strong reliance on RTO initiated time-out. This can lead to lower retry performance and is not considered optimal for best-effort networks. SBMP may not be supported by RTA and any such per-packet multipath capability in the switch can be disabled for RTA traffic, but may be enabled in some cases.

RL can support coalesced ACKs and piggy-backed ACKs that can be opportunistic features to reduce the cost of sending ACKs through the network, and this can substantially reduce consumption of bandwidth and packet rate for ACK traffic. RLC tuning parameters (such as timers and disables) can be used so that ACK return latency is not impacted in specific workload scenarios where ACK coalescing and piggy-backing are not possible.

Ordering

There are several factors that cause packets to arrive out of order to the RLC receive side. For example, multipathing of a single flow across multiple paths causes the packets in that flow to arrive out of order. This is very frequent when multipathing is used for an RLC. Another cause is packet loss (e.g., due to network congestion, buffer overflows and link errors), which triggers the retry protocol, and retried packets are out-of-order with respect to non-retried packets.

The frequency of this is determined by the packet loss rate. Another cause is changes in fabric routes (e.g., due to load balancing, switch reboots or downed links) can cause packets to arrive out of order. This is relatively infrequent.

An RLC can be configured at connection time to provide either unordered or ordered delivery mode.

Unordered Delivery Mode

Packets sent on the RLC are delivered reliably by the RL in any possible, legal reordering to the receiver. This mode is suitable for TLs that do not use original send order, or that have their own capabilities to re-establish ordering. A particular TL may be able to implement a reordering mechanism uniquely suited to its requirements. However, a TL level solution is inherently TL specific and this could lead to duplication of functionality and buffering across multiple TL instances.

In unordered delivery mode, packets that arrive out of order are directly up to the TL. This means that RL does not need to provide any packet reordering capability. The TL may have its own limits on how much packet reordering can tolerate, and then it becomes the TL responsibility to maintain reliability and acceptable performance with that limit. The TL RX is not allowed to stall RL RX due to RL delivering a packet beyond that limit.

Ordered Delivery Mode

Packets sent on the RLC can be guaranteed to be delivered reliably by the RL in the original send order to the receiver. This ordering can be applied at the RLC level. Delayed or retried packets on one TLC have a head-of-line performance consequence to packets on other TLCs that are multiplexed on the same RLC. This mode is suitable for TLs that use original send order and do not have their own capability to re-establish this order. There are many higher level communication models where constraints are placed on the allowable order of operations, often leading to packet order constraints. RL can re-establish the original send order using hardware mechanism in the RL receive side before delivery of the ordered packet stream to the TL RX.

The choice between these modes can be made by the TL. An RL implementation is to implement both modes. Unordered mode can be used. Ordered mode can be used at least because many TLs are inherently based on ordered packet delivery. This approach promotes inter-operability and generality of RL implementations.

Ordered mode is potentially much more expensive for RL implementations because of a case to re-establish the original send packet order using a Packet Reorder Buffer (PRB). The PRB is of finite size, and in the case where the capacity of the PRB is exceeded the RL RX will drop packets. RTA can allow the RL implementation to choose the presence and size of the PRB as a trade-off between performance and cost/complexity. In the limit, an RL can choose to not support a PRB. The effect of this is that ordered delivery mode reverts back to a go-back-N protocol since the packet with the next sequential Path Sequence Number can be accepted and delivered to the TL. This can be achieved without a PRB since no reordering is used. However, any packet that does not match the expected sequence number on an RLC can be dropped (since there is no PRB) and retried. Without a PRB, the reliability protocol and performance characteristics intrinsically fall-back to standard go-back-N for the ordered delivery mode. On a best-effort network this can lead to substantial performance consequences as previously noted. Still, the generality of being able to support an ordered delivery mode in all RL implementations is valuable, and there may be low performance use case, system configurations (e.g., very low packet loss rate) or low-cost RL implementations where this this trade-off is appropriate. In other scenarios the PRB can be sized appropriately to give the applicable level of performance.

Unordered delivery mode is always available, does not use any PRB, and delivers full RL performance.

Packet Reorder Buffer

The Packet Reorder Buffer is an optional, architecturally-visible buffer on the RL receive side used to re-establish packet order for the ordered delivery mode. There may be additional unrelated buffering in the implementation that is independent of the PRB. Such buffering can absorb bursts, provide for PFC skid, avoid head-of-line blocking, or other micro-architecture/implementation buffering reasons. The term PRB does not include these buffers.

The presence and size of the PRB is an important implementation choice impacting the performance characteristics of the ordered delivery mode. The challenge is exemplified by a long stream of packets pipelined into a best-effort network where one (or more) of the packets is dropped. The sender will pipeline many packets into the network to cover the BDP of the connection in order achieve the desired bandwidth. The receiving RL does not receive the dropped packet and therefore cannot deliver it to the TL at that time. RL can detect the packet loss through sequence number observation and send a SACK to request retry and the retried packet arrives after an RTT delay.

When the delivery mode is ordered, RL can wait for the retry packet. For full performance the RL RX would be used to absorb the packet pipeline without drop and this drives receive-side buffering requirements sufficient to buffer the BDP of the connection. A long stream of packets can use multiple paths from TX to RX, so the SACK for the dropped packet may be delayed.

Figure 4:
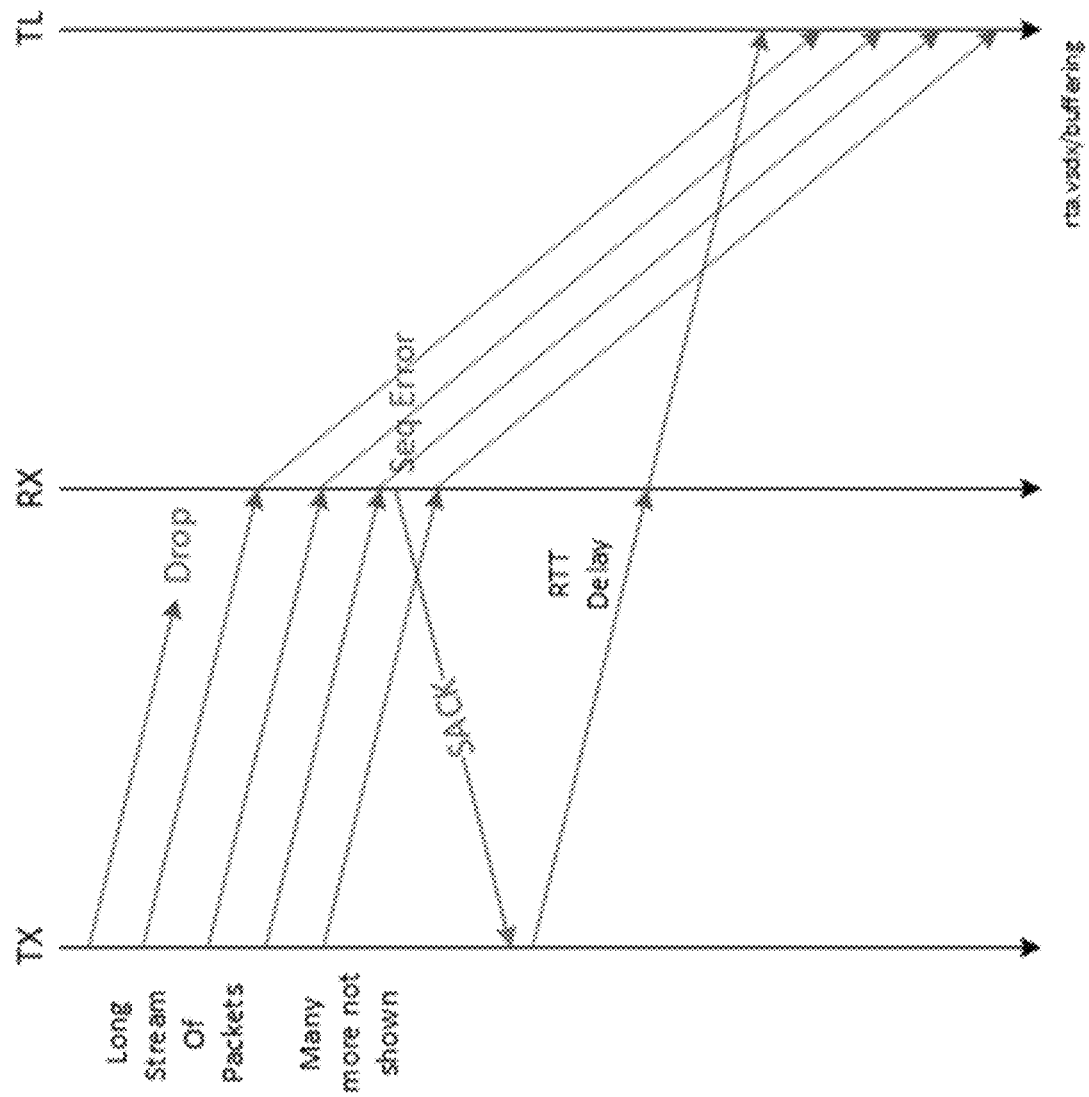
FIG. 4 depicts an example of receive-side buffering scenario for an ordered RLC.

FIG. 4 depicts an example of receive-side buffering scenario for an ordered RLC. In this example, 2 MB of buffer space would be needed, driving significantly higher cost into the solution. The cost of this buffering varies dramatically per the Performance Parameters of the targeted system. A large scale 400GigE system with commodity Ethernet switch designs, and significant congestion hot-spots might specify an RTT_loaded of 40 us. For example, 2 MB of buffer space can be used to cover BDP and drives significantly higher cost into the solution. Higher values of RTT_loaded can use yet more buffering.

Multipath Overview

Figure 5:
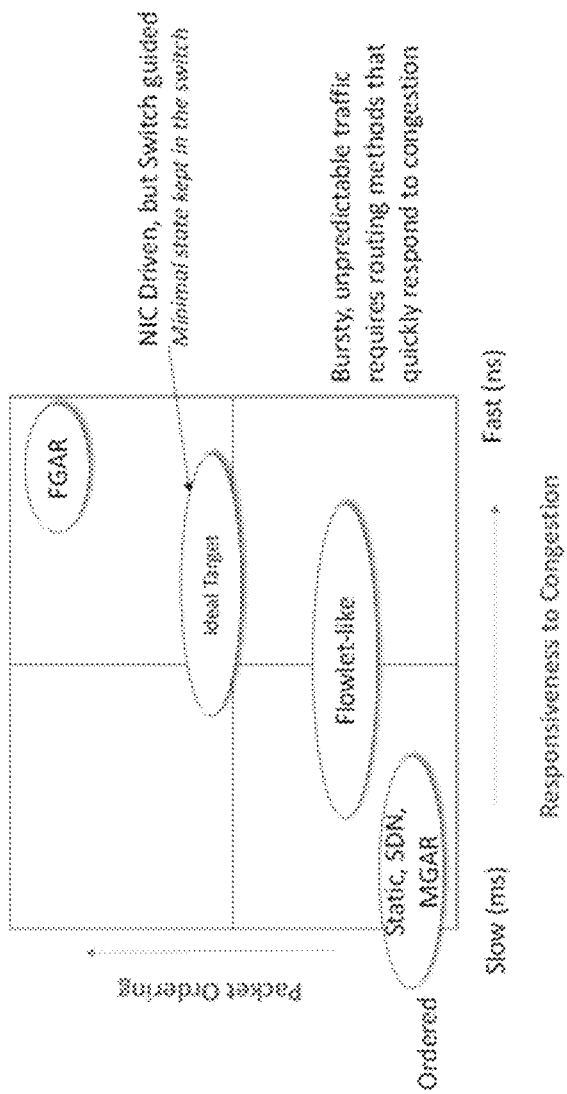
FIG. 5 illustrates tradeoffs associated with load balancing as a reaction to congestion versus complexity associated with packet ordering and impact on protocols.

FIG. 5 illustrates tradeoffs associated with load balancing as a reaction to congestion versus complexity associated with packet ordering and impact on protocols. In general, load balancing bursty and unpredictable traffic uses a quick response to congestion.

Static techniques such as ECMP and/or SDN driven Medium Grain Adaptive Routing (MGAR) can reduce the complexity associated with packet ordering, however, are very slow to react and may not be able to move congestion hot-spots away in time. On the other hand, Fine Grain Adaptive Routing (FGAR) techniques can react fast to congestion hot spot events, but increases the complexity associated with packet reordering. Moreover, for effective performance gains the FGAR needs to be done by the switch fabric.

The approach taken by the RL load balancing/multipath is a mid-ground where the NIC manages the path with response times within the RTT of the network fabric. RL flows support multipathing through the network fabric. Once the RL connection is established, the end nodes can start to use as many paths as negotiated and/or configured by the SDN controllers. A Multipath RL connection is composed of several paths, with the maximum number of supported paths being 16 (implementations may have a lower limit). RL connections are identified by source and destination connection IDs that are carried as part of the RL Headers. On the network, each path is associated with a different five-tuple with UDP.SrcPort being one of the variants. A path ID is maintained at the end nodes to enforce policies associated with a chosen source port.

For example, packets of a connection can be sent over multiple paths. Paths can be selected per-packet and path selection may not have any relation to higher-layer connections or flows. For example, a single bulk flow can be spread across available paths. In some examples, ECMP or any variant can be used to load balance traffic among paths based, for example, on n-tuple hashes of fields of a packet header. A path chosen for a given n-tuple hash can remain largely static unless there are link faults or SDN initiated traffic re-balancing. For example, n-tuple can be any of layer 3 destination address, source address, layer 4 destination port, layer 4 source port, or protocol used. In either case, packets can be delivered in order within a chosen path (or per source port). Detection of packet losses on a per-path basis may be detected and a receiver can send selective acknowledge packets in manners described herein. End nodes can collect network information per path, such as round-trip time measurements and maintain a per-path congestion window.

RL multipath flows can face reordering at packet-level when using paths having different end-to-end latencies. A per-Path Sequence Number in an RL header of a packet provides monotonically increasing sequence numbers for packets sent over a given path. Multiple available paths for transmission of packets provides that a packet transmitted over one path to be potentially retransmitted later on another path with a different Path Sequence Number. A packet can be assigned a global sequence number (GSN) and a path-specific sequence number (PSN). A GSN can correspond to a global packet transmission order. A PSN can correspond to a transmission order on a path. A path can be identified by a path identifier. To reorder traffic across multiple network paths, a receiving node can use the GSN and PSN. A receiving node can use the GSN and PSN to detect path specific packet losses and issue selective ACKs or NACK as appropriate in the case of detected loss of packet.

An end node can select which path to send path acknowledgments back to a sender. Packets that were sent over a given path can be acknowledged by an ACK sent on another path to limit the latency due to ACK transmission/retransmission on high-latency paths. An ACK packet can maintain per-path packet acknowledgments. In some examples, a transmitter's switch fabric can be configured to prioritize ACK packet over data packets.

In some examples, a limited number of paths are used per connection and traffic may not be transmitted across all possible paths. A used path can be separately tracked by endpoints for reliable delivery and congestion status.

Congestion can be detected on the paths individually, and traffic moved from a congested path to an uncongested path. By assuming that packets on each path generally are received at an end point in order of transmission, packets can be retransmitted if a gap is observed in the packets received from a particular path. The transport can work with asymmetric topologies, or in networks that are temporarily asymmetric due to, e.g., a link failure.

A data packet format can include one or more of the following: GSN, path descriptor or identifier, PSN, and PSN_BASE. GSN (e.g., 32b) can be used to distinguish individual datagrams. A packet can retain a same GSN if the packet is retransmitted. In some examples, a window of sequence numbers can be used at any one time and a 32b size (or other size) of GSN can be used to provide duplicate-packet rejection at the receiver, and is intended to cover a maximum lifetime of a delayed packet in the network.

A path descriptor (e.g., 16b) can be carried in a UDP source port field. A PSN (e.g., 16b) can be sequential in order of transmission on a given path and retransmitted packets can be assigned a new PSN (and potentially a different path). PSN_BASE (e.g., 16b) can represent a new base of a PSN window, acknowledging selective-ack information from the receiver, indicating that the receiver can stop resending selective-ack information for packets up to that PSN. PSN_BASE can be updated when reacting to packet loss and SACK (or when PSN rolls over). PSN_BASE field may be placed in an optional header of a packet.

Example pseudocode for sending a packet with a payload is as follows.

```
procedure TransmitNewDataPacket(payload,TL_handle) = {
  pkt.opcode  := DATA;
  pkt.payload := payload;
  pkt.GSN     := tx.GSN; tx.GSN++;
  if (rx.ack_timer.piggybackAcks( )) then AddAcksToPacket(pkt);
  SetPathAndPsn(pkt);
  // save packet for possible retransmission; can implement
  // as full payload buffer or as packet descriptor
  tx.resend_buf{pkt.path,pkt.PSN} := {payload, GSN, TL_handle, 0 /*retry_count*/};
  Send(pkt) // generate headers and enqueue packet for transmission
}
procedure SetPathAndPsn(pkt) = {
  if (pkt.opcode matches "DATA*") then tx.PSN[path]++;
  path = SelectPath(pkt);
  pkt.pathID   := path;
  pkt.path_desc := {b11,tx.path_steering[path],path}; // for UDP encapsulation
  pkt.PSN      := tx.PSN[path];
  pkt.PSN_Base := tx.PSN_Base[path]
}
```

Paths can be chosen according to weights specified by a Congestion Control Sublayer. The pseudocode shown below to select a path is intended to be illustrative and implementations may vary. The pktLengthOverhead function is intended to help balance the effects of short and long frames, taking effects such as tunnel headers and interframe gap into account and can be a rough approximation, since any transient bias introduced can be corrected for by congestion control.

```
function SelectPath(pkt): int = {
    // add credits according to path weights
    while (AND(p in 0..tx.maxPath: tx.credit[p] < 0)) do
        for all p in 0..tx.maxPath do
            tx.credit[p] += tx.weight[p];
    choose path such that (tx.credit[path] >= 0);
    // subtract credits for packet length, making allowance for IFG & tunnel headers
    tx.credit[path] -= pkt.length( ) + pktLengthOverhead( );
    return path;
}
```

NIC Driven Multipathing

A transmitter NIC can determine whether to send packets of a connection over multiple paths or a single path. In some examples, switches can influence in the decision to provide multipathing by using switch based hints. For a source-destination connection pair, an end node transmitter NIC can maintain a table that contains a list of available paths. Each path could be identified by a specific UDP source port number or a pointer to a table containing source ports. The transmitter NIC can maintain a per connection flow table that lists available paths or routs. An SDN controller based on the topology and ECMP programs running on the NIC control plane can populate the table.

The transmitter NIC can maintain a set of metrics along with the path information. Some metrics can include one or more of route (e.g., path length, hop, bandwidth, delay, reliability, load, path cost); path delay (e.g., processing delay, available bandwidth, link delay, packet pair delay); congestion (e.g., queue length, queueing delay, link delay, number of neighbors, history on congestion as seen due to packet drops or ECN marking received by Switch/End Nodes); or states associated with path specific sequence numbers and outstanding packets.

Metrics can be updated based on one or more of the following criteria. In some examples, an SDN Controller can explicitly set priorities to paths. In some examples, metrics can be updated based on congestion such as ECN markings and/or based on NACKs/ACKs received from the end nodes. In some examples, switch based hints can be utilized that reflect a more accurate congestion information from the fabric. Some of these hints can be derived based on telemetry data collection through the network and processing them in the NIC control plane. A weighted selection that is driven based on congestion detection and available window size per path can be used for traffic pacing on a per path basis. For example, ordered request/response may use a single path in order to avoid reordering at the receive mode.

RTT per path and skew traffic generation can be collected based on congestion. In some examples, each path runs DCQCN based congestion management independently, and updates the appropriate metrics in the table used for path selection.

Figure 6:
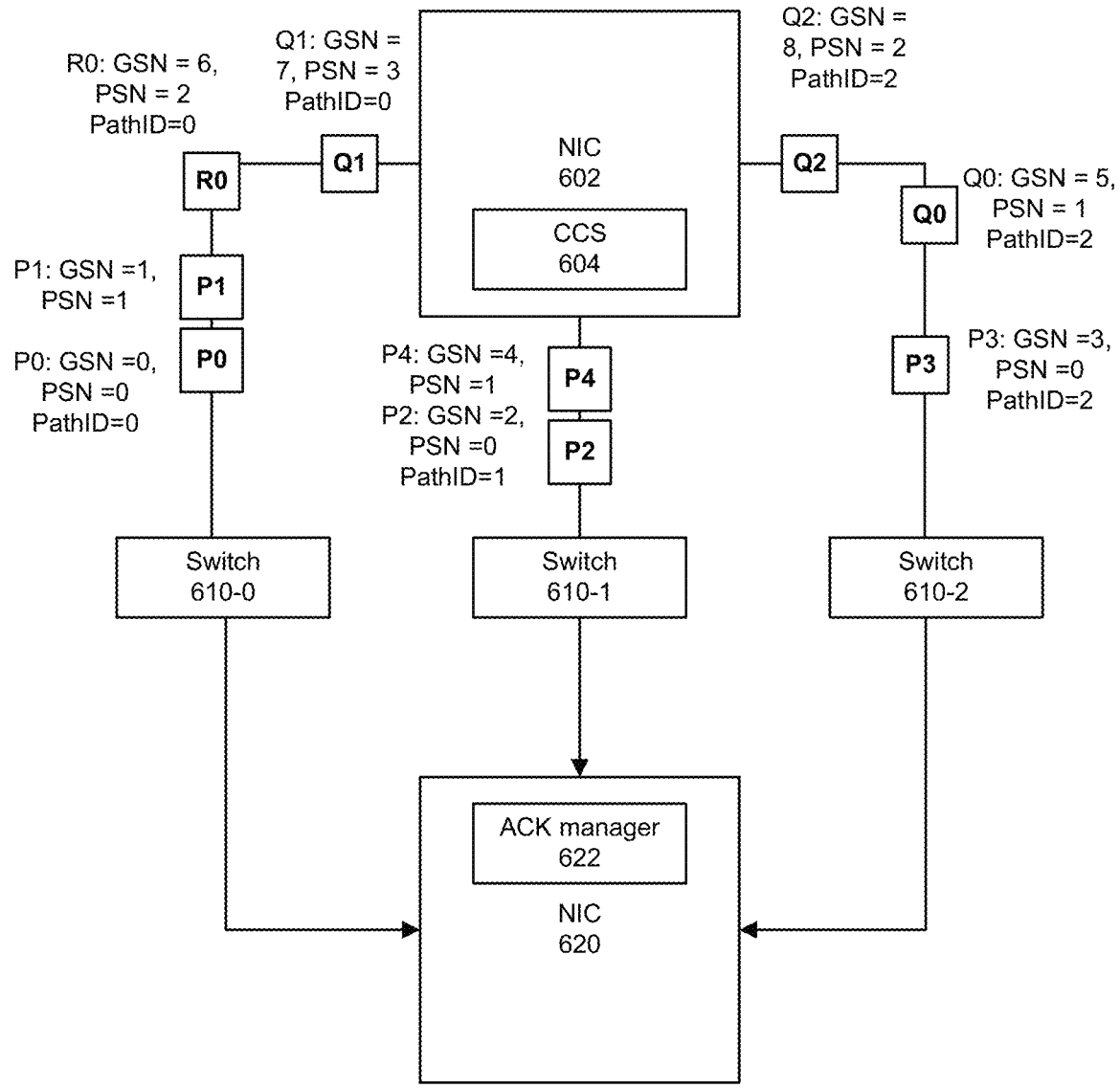
FIG. 6 provides a system view of various embodiments.

FIG. 6 provides a system view of various embodiments. When transmitting a data packet, sender NIC 602 can choose a path; assign the packet a next Path Sequence Number (PSN) for that path; assign the packet a next Global Sequence Number (GSN) (if a new packet) over all packets transmitted across available or utilized paths or retain a GSN of a retransmitted previously transmitted packet; and record GSN and packet descriptor for that (path ID, PSN) pair, to be used when retransmitting. In this example, NIC 602 can transmit packets P0 to P4, Q0 to Q2, and R0 to NIC 620. Congestion Control Sublayer (CCS) 604 can select a path for packets P0 to P4, Q0 to Q2, and R0 in accordance with embodiments described herein.

In this example, packets P0 and P1 and R0 and Q1 (in that order) can be transmitted through a path 0 through switch 610-0 to NIC 620; packets P2 and P4 can be transmitted (in that order) through a path 1 through switch 610-1 to NIC 620; and packet P3 and packets Q0 and Q2 can be transmitted (in that order) through a path 2 through switch 610-2 to NIC 620. In other examples, multiple network elements can be provided in a path or no network elements are provided in a path.

A global order of transmission across paths 0 to 2 can be P0, P1, P2, P3, P4, Q0, R0, Q1 and Q2. Accordingly, GSNs for packets P0, P1, P2, P3, P4, Q0, R0, Q1 and Q2 can be respective 0, 1, 2, 3, 4, 5, 6, 7, and 8. As packets P0, P1, R0, and Q1 are transmitted on path 0 in order, PSNs for packets P0, P1, R0, and Q1 can be respective 0, 1, 2, and 3. As packets P2 and P4 are transmitted on path 1 in order, PSNs for packets P2 and P4 can be respective 0 and 1. As packets P3, Q0, and Q2 are transmitted on path 2 in order, PSNs for packets P3, Q0, and Q2 can be respective 0, 1, and 2. As described herein, GSNs can be used to reconstruct data at a receiver (e.g., NIC 620 or a host computing device (e.g., server)) by assembling data sequentially according to increasing GSN number. In some examples, GSN can be used to reconstruct packet transmission order using for example, a re-order buffer. As described herein, PSN can be used to identify a gap in PSNs at the receiver and request re-transmission. Note that in this example, GSN and PSN both start at 0, but any starting value can be used to reflect a number of previously transmitted or allocated GSN and PSN.

In this example, NIC 620 receives all packets P0, P1, P2, P3, P4, Q0, R0, Q1 and Q2. Acknowledgement (ACK) manager 622 can generate acknowledgements (ACKs) and selective acknowledgements (SACKs) in accordance with embodiments described herein to inform NIC 602 that a packet was received or to resend one or more packets.

Figure 7:
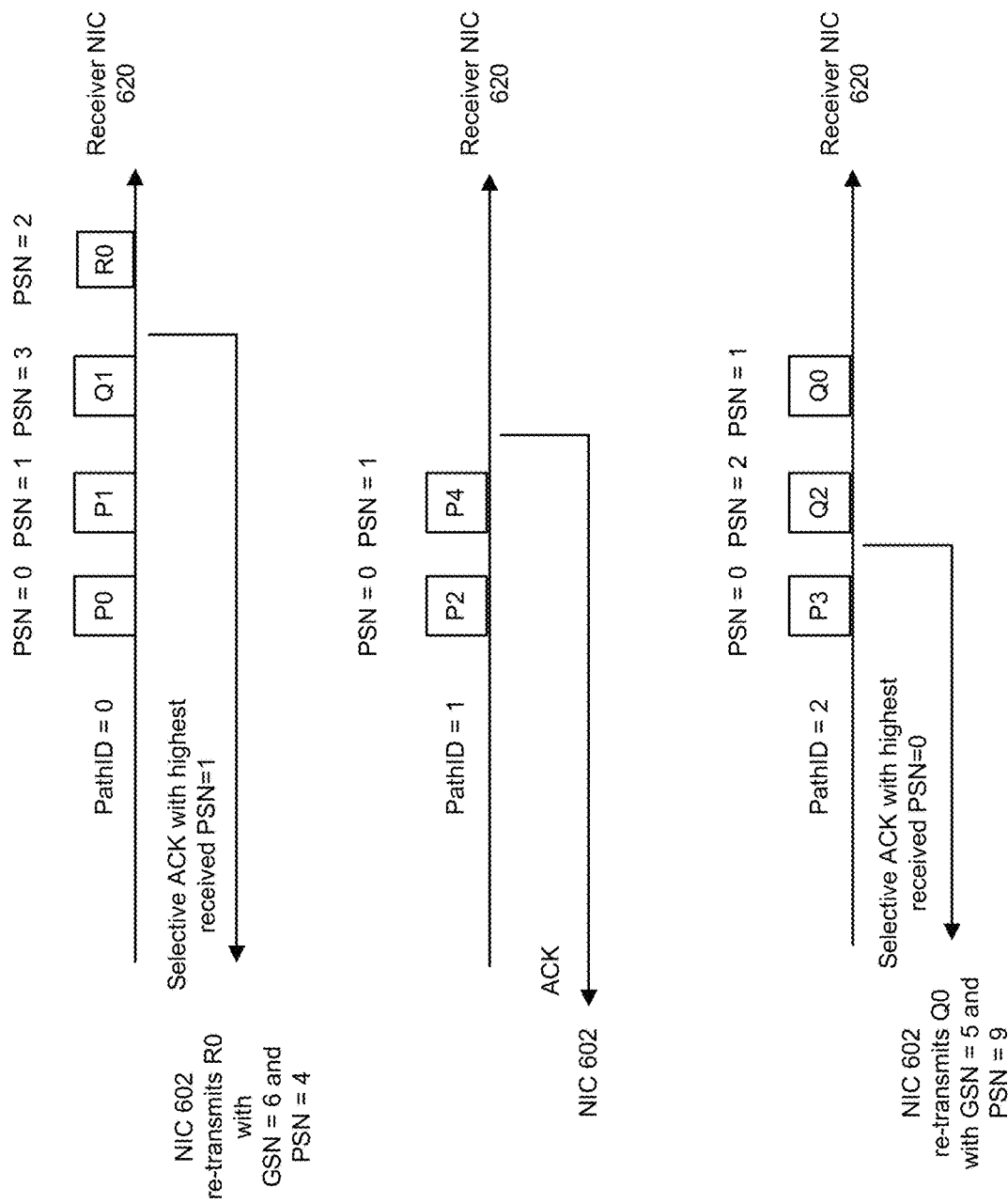
FIG. 7 provides an example of selective acknowledgement transmissions.

FIG. 7 depicts an example of processing of received packets according to the example of FIG. 6. On path 0, receiver NIC 620 receives packets P0, P1, Q1, and R0, in that order. As the PSN of packet Q1 is 3 but the highest received PSN on path 0 at receipt of Q1 was 1, receiver NIC 620 sends a selective ACK to transmitter NIC 602 with highest received PSN of 1. In response, sender NIC 602 re-transmits packet R0, with a same GSN=6 as that used in a prior transmission but with a PSN=4, which is a next Path Sequence Number for packets transmitted on path 0. If packet R0 is received twice, the first or second received R0 can be discarded.

On path 1, receiver NIC 620 receives packets P2 and P4 in order. The PSNs of packets P2 and P4 are in order with no gaps. In response, receiver NIC 620 transmits an acknowledgement of receipt of packets P2 and P4.

On path 2, receiver NIC 620 receives packets P3, Q2, and Q0. As the PSN of packet Q2 is 2 but the highest received PSN on path 0 at receipt of Q2 was 0, receiver NIC 620 sends a selective ACK to transmitter NIC 602 with highest received PSN of 0. In response, transmitter NIC 602 retransmits packet Q0, with a same GSN=5 as that used in a prior transmission but with a PSN=9, which is a next Path Sequence Number for packets transmitted on path 2. If packet Q0 is received twice, the first or second received Q0 can be discarded.

Figure 8:
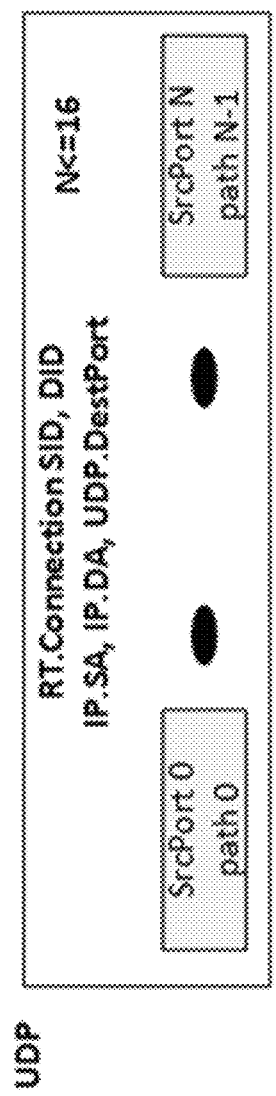
FIG. 8 depicts another example of selection of multiple paths.

FIG. 8 depicts another example of selection of multiple paths. In this example, N=16 paths are available for use, but N can be any integer.

Examples of RL Packet Format

Figure 9:
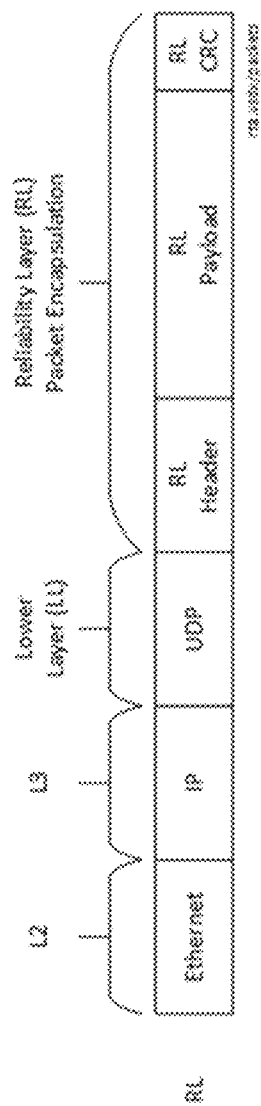
FIG. 9 depicts an example RTA Packet Format.

FIG. 9 depicts an example RTA Packet Format. RTA packets can be transmitted as UDP packets with a specified a destination port number. The packet format can support Layer 3 IP routing and is analogous to RoCEv2. For example, an EtherType can identify a packet as utilizing RL. An Ethernet MAC header can be followed by a RL Header. The format would be analogous to RoCEv1 and suitable for use on systems without IP routing and where it is desired to eliminate the overheads of the IP and UDP headers.

FIG. 10 depicts an example RL packet format. An RL Header can be prepended to RL packets as well as acknowledgements. An RL header can be a multiple of 32 bits and its size can be specified in a HDR_SIZE field. For example, the table below can describe fields in a RL.

TABLE

RL Header Fields

| Format Name | Field Name | Number of Bits | Description |
|---|---|---|---|
| A | OPCODE | 8 | RL OPCODEs are assigned using an 8-bit value with the upper two bits always set. This gives a total of 64 distinct operations. The following OPCODE assignments are examples:<br>0xC0: DATA<br>0xC1 : ACK<br>0xC2: CONNECT<br>0xC3: DISCONNECT<br>0xC4-0xFF: RESERVED<br>The rationale for this encoding is for consistency with existing IBA/RoCE opcode values such that RL opcodes can be overlaid in the IBA manufacturer-specific opcode space:<br>IBA opcode[7:5]<br>  110b-first range of 32 opcode values (manufacturer-specific opcodes in IBA)<br>  111b-second range of 32 opcode values (manufacturer-specific opcodes in IBA)<br>IBA opcode[4:0]<br>  5 bits to encode 32 different opcodes (per above range) |
| A | RESERVED | 2 | Reserved |
| A | PAD_SIZE | 2 | Size of pad bytes added to the RL payload before RL CRC for 4B alignment |
| A | VERSION | 4 | RL Protocol Version Number |
| A | RL Flags | 8 | Field carrying flags for RL communication (encoding can be used) |
| A | HDR_SIZE | 8 | Encodes the size of the RL header in 32-bit multiples (including TLV list if present) |
| B | PSN | 16 | Path Sequence Number |
| B | PSN_BASE | 16 | New base of PSN window for this path, to acknowledge SACK. May move to optional header |
| C | GSN | 32 | Global Sequence Number. This can be expanded to 48 bits through optional headers |
| E | RESERVED | 8 | Reserved |
| E | SRC_RLC | 24 | Source RLC ID |
| F | NEXT_HDR | 8 | Next Header-this is an enumeration to specify the format of the next header (e.g., to differentiate the TL running over RL)<br>(This could be expanded to a 16-bit field to allow IANA-assigned destination port numbers to be used as the next header value) |
| F | DST_RLC | 24 | Destination RLC ID |
| G0/1/.. | Optional Headers | Variable | Optional headers of variable size |
| H | RL Header Checksum | 16 | 16 bit checksum for RL headers including optional headers (RL RX accepts or drops packets based on RL CRC validation. The 16-bit checksum protects TLV fields modified by the switch for switch-based hints, and this lower level of protection is considered sufficient for performance hints.) |
| H | RESERVED | 16 | Reserved (Could swap this field with the previous 16-bit RL Header Checksum) |

RL Optional Headers

The RL headers can be expanded by optional headers. Optional headers can be added on the end nodes as needed. Switches can modify and add headers within this field in order to provide switch based hints. The optional headers can be stacked headers in the form of Type-Length-Value (TLV) structure. Each of these structure can be 4B aligned.

TABLE

Example of RL Optional Header Fields

| Field Name | Number of Bits | Description |
|---|---|---|
| Type | 8 | Indicates the kind of the information carried in this structure. |
| Length | 4 | Number of following 4B words in the optional header. This supports a range of 4 to 64 total bytes in the tag. |
| Value | (32 * Length) + 20 | Variable-sized 4B-aligned field, containing data whose contents and structure are determined by the Type field. |

Various type specific encoding and usage are as listed next.

TABLE

Example of RL Optional Headers

| Type | Size (Bytes) | Name | Usage and Value Fields |
|---|---|---|---|
| 0 | 0 | null | Null TLV. Optional |
| 1 | 4-16 | ACK or Selective ACK (SACK) | ACKs or Selective ACKs sent from receiver to transmitter. Includes Path ID (from transmitter to receiver) being acknowledged (4 bits) Last Path Sequence Number (PSN) received (16 bits) The sequence numbers excluded from a Selective ACK (SACK) can be specified in the form of one or more ranges. A maximum of three such ranges can be specified per SACK header; each adds 4B to the header. Fields carried as part of the SACK range are PSN at base of range (16 bits) Delta of next acknowledged PSN from the base, up to 16K (14 bits) Code indicating range type (2 bits) 00b: standard range 01b: overflow range (could limit to at most one use per SACK) 10b/11b: Reserved Up to three such ranges can be carried per message, thereby the total size of a SACK can vary from 8B to 16B. A single packet can carry multiple ACK/SACK headers; each can refer to a different Path ID. |
|  | 4 | BECN | Backward Explicit Congestion Notification. Carries: Path ID (from transmitter to receiver) whose congestion level is being reported (4 bits) Congestion level at path bottleneck (or most-used link) (8 bits) 0-127: Link under-utilization (link BW is roughly N/128 of capacity) 128: Link at capacity without congestion 129-255: Link congestion (incast to link is roughly 128/(256-N) of capacity) If congestion is detected but no further detail is available, the value 192 (corresponding to 2x incast) could be used Bottleneck location, in number of hops from transmitter (6 bits) 0: unknown; 63: saturates (hop 63 or later) A single packet can carry multiple BECN headers; each can refer to a different Path ID. |
| 2 | 8 | Global Rolling Byte Count | 48 bits of global byte count. This field can be used by Ordering Sublayer for reassembly |
| 3 |  | End to End Credits |  |
| 4 |  | Switch Based Hints | Any communication of hints from Switch to NIC receiver or transmitter for actions |
| 5 |  | NIC based hints | Any communication of hints from NIC transmitters to Switches for actions |

RL Payload can be a payload provided by the TL and can be opaque to RL. An RL payload can be multiples of 4 bytes, or other sizes. A maximum size can be determined by the MTU minus other per-packet overheads. A maximum size is not necessarily a power-of-two.

RL CRC can be a 32-bit CRC that is invariant from RL TX through to RL RX covering the RL header and RL payload. It may be desirable to change the RL CRC approach relative to RoCEv2's ICRC to give uniform protection of fields in the RL header (see, e.g., IBA ICRC behavior for FECN, BECN and Resv6a fields). Alternatively, these bits could be left unused.

The RL header format can be defined such that it overlays existing IBA/RoCEv2 opcode space and the RL packet is always a valid, correctly-formed, manufacturer-specific RoCEv2 packet. This can allow the RL packets to pass through switches and NIC packet pipelines as if they were RoCEv2 packets with no additional configuration necessary (such as rules for a new destination port number). This potentially gives better inter-operability with existing data center deployments. For this to be achieved, with adherence to RoCEv2/IBA specifications: the UDP destination port value would be set to the RoCEv2 standard value of 0x12B7; the RL 8-bit OPCODE field is in the same place as the RoCEv2 format and take values in the range [0xC0, 0xFF] (note that these opcode values may collide with other vendor's extensions and therefore OPCODE alone is not sufficiently unique to identify the RL packets); the RL 4-bit VERSION field is in the same place as TVer in the RoCEv2 format but if TVer is changed to a non-zero value, then RL may redefine the remaining fields in the RL header (so as to not be compatible with BTH) and may also redefine the CRC approach to be different to RoCEv2's ICRC. A non-zero VERSION guarantees that RoCEv2/IBA standards-compliant HCAs/NICs will drop the RL packets.

The Multipath Reliability Sublayer (MRS) can attempt to guarantee that every packet sent over it can be delivered to the appropriate receiver exactly once. MRS can minimize the latency of each packet sent over it, making use of one or more of: NIC-driven multipath, Selective ACK, Timeout reduction.

NIC-driven multipath can utilize multiple paths through the network, at a sub-flow or per-packet granularity and selected by the sender. First, by breaking up large flows into smaller components, it greatly decreases the likelihood of hot-spots due to hash collisions placing too many flows on the same link. Second, tracking and comparing congestion on multiple paths allows the congestion management mechanism to intelligently move traffic from congested to uncongested paths.

Selective ACK can provide transport that is robust to packet drops, due to congestion or other causes. Selective ack can generally limit retransmissions to those packets that have actually been lost.

FLUSH (flush) packets can be a mechanism to probe whether the original packet was received, which can be triggered earlier and result in much less delay. After a sender stops sending packets on a path, and after a small delay (e.g., "sender flush timer"), the sender can send a FLUSH packet with the same PSN as the last data packet on the path. If the data packet gets dropped, the FLUSH packet can tell it that a data packet with that same PSN should have been received, and the receiver will request a retransmission of the data packet with that same PSN. Because FLUSH packets are small in size, this flush operation can be done more aggressively (e.g., sooner) than resending the entire data packet. Use of FLUSH packets can provide a reduction in timeouts, in which retransmission of a lost packet, if no ack (or nack, in some protocols) has been received, can be triggered by expiration of a timer. This timer value can be set quite high, as retransmission is an expensive operation that can exacerbate congestion if it is triggered when the original packet was delayed, not lost.

Example pseudocode to generate a FLUSH (flush) packet is below.

```
procedure TransmitFlush = {
   CreateFlushPacket(pkt);
   pkt.IMM_ACK := true;
   pkt.PRIORITY := true;
   if (rx.ack_timer.piggybackAcks( )) then AddAcksToPacket(pkt); // optional
   Send(pkt)
}
procedure CreateFlushPacket(pkt) = {
   new pkt;
   pkt.opcode := FLUSH;
   pkt.GSN    := tx.GSN;
   SetPathAndPsn(pkt);
}
```

Examples of NIC selected Multipath Protocol

Examples are provided of a data plane protocol for establishing and closing a multipath connection and for maintaining packet ordering across one or more paths. Congestion Control Sublayer can manage determining the number of paths to use, and distributing traffic among them.

For a given connection, a path can be defined by a path descriptor (e.g., 16b). A path descriptor can be placed in a UDP source port field of data packets and included in the n-tuple hashing for ECMP in the network. Encapsulation of RL can use other, non-UDP protocols such as MPLS, but outer headers include a path descriptor used by the network to influence the path taken.

A path descriptor for UDP encapsulation can include a path ID (e.g., in bits 3:0), a path steering value (e.g., in bits 13:4), and the top two bits equal to b 11 (in bits 15:14) to keep the UDP source port within the UDP ephemeral port range of 49152 to 65535, as recommended by RFC 8085 when the source port is used for entropy. Note that a path ID can also be included in the RL header, so its use in the path descriptor is for path discrimination in the network. A path can be used to index paths from 0 to N−1, within a given RLC connection and starting with a given sender. Paths in opposite directions within an RLC can be unrelated, even if they use the same Path ID.

Path steering can be specified using an additional value (e.g., static value per path) to influence the choice of links used. For ECMP hash, a path steering value could be a pseudorandom number, but this may sometimes result in aliasing between different paths (e.g., different path descriptors can result in traversing exactly the same set of links). In an environment in which the path used is readily predictable based on the steering bits, the steering might be chosen to structure the path steering in more limited ways, for instance, the particular link used in a LAG might be chosen based on the path ID bits so that paths naturally stripe across LAGs evenly.

For a NIC with multiple uplinks to the same network, a path can also include the choice of uplink. This may be done by n-tuple hash, or by some other state stored in the sending NIC.

Tunnel encapsulation or NAT may change the UDP source port used in the packet's outer headers. For NAT, there could be a 1:1 mapping between internal and external 5-tuples, so the entropy in the hash can still be present. For tunnel encapsulation such as VXLAN, GRE, or Geneve, the entropy can generally be propagated to the outer UDP header through hashing of the inner n-tuple.

Selective ACK can be utilized whereby a receiver can request a packet retransmit immediately when the receiver detects a packet gap. Various embodiments of a receiver presume that packets arrive in-order of transmission at the receiver within a path. If there is packet reordering within a path, packet retransmission can be requested connection failure may not occur. Using selective ACK, a receiver can identify if there is any gap in PSN values and request packet retransmission and the sender can inform the receiver when selective ack has been received and processed, by updating a PSN window base.

When a data packet arrives, a receiver can (1) validate the packet and ignore it if errored or stale and (2) compare a received PSN with highest PSN received. The highest PSN received can represent a highest sequential PSN value received. For example, if PSN values 0-4 were received and a PSN of a received packet is 8, the highest PSN received could be 4. If the PSN is the next sequential value after the highest PSN received, the packet is accepted. If the PSN is not the next sequential value after the highest PSN received, the receiver can accept the packet and send a selective ack immediately without accumulating acks across a time window, to trigger a resend of any missing packet(s). If a PSN is less than a PSN already received, the packet can be discarded. The receiver can also clear the per-path scoreboard of missing packets, up to the new PSN_Base, to stop sending selective acks for those packets.

The ReceivePacket pseudocode below can handle all incoming RL packets, not just data packets (e.g., packets with DATA or DATA+ACK opcodes, shown as "DATA*" below). The handling of flush packets (opcodes FLUSH or FLUSH+ACK, with no payload) is similar to that of data packets, except that they do not advance the PSN. The handling of non-data packets is described below.

```
procedure ReceivePacket(pkt) = {
   if ~ValidatePacket(pkt) then stop;
   if (pkt.opcode matches "CTRL|CON*|DISCON") then
```

-continued

```
            HandleControlPacket(pkt); stop;
    if (pkt.opcode matches "DATA*|FLUSH*") then
        data := (pkt.opcode matches "DATA*");
        path := pkt.pathID;
        diff := pkt.PSN-rx.PSN[path];
        if ((data AND (diff==1)) OR (~data AND (diff==0))) then
            // PSN advanced normally
            rx.PSN[path] := pkt.PSN;
        else if (diff > 0) then
            // unexpected PSN gap; send immediate selective ack
            last_missing := (data ? pkt.PSN-1 : pkt.PSN);
            AddAckExcludedRange(path,rx.PSN[path]+1,last_missing);
            imm_ack := true;
            rx.PSN[path] := pkt.PSN;
        else if (diff <= 0) then
            // report reordering event or error, and discard packet
            stop;
        // use PSN_Base to acknowledge old excluded ranges from selective ack
        ClearOldAckExcludedRanges(path,pkt.PSN_Base);
        // start ack timer if PSN has advanced
        if (diff > 0) then rx.ack_timer.start( );
    if (pkt.opcode matches "*ACK*") then HandleAcks(pkt);
    if (pkt.opcode matches "DATA*") then
        delivered = Deliver(pkt); // pass packet to receiving Transport Layer, or to Ordering Sublayer
    (for an ordered RLC);
                        // return false if unable to do so
        if (delivered) then
            // TBD: mark packet in map of received GSNs
        else
            // can't deliver; send selective ack requesting retransmission
            // TBD: also send BECN indicating receiver node bottleneck
            AddAckExcludedRange(path,pkt.PSN,pkt.PSN); // could optionally merge any adjacent
AERs
            imm_ack := true;
    if (imm_ack OR pkt.IMM_ACK) then TransmitImmediateAck( );
}
```

Packet Validation and Error Checking

Various error checks can be performed on received packets before they are further processed. Packets that fail error checks can be discarded. In some cases, the control plane can be notified of the failure, as it can indicate an error condition.

If a PSN of a received packet precedes a current PSN for a path, the received packet can be marked as stale. If GSN in a received packet has already been received at a receiver, the receiver can discard the packet as stale and duplicated. Stale packets may occasionally be produced by reordering events (e.g., path changes) in the network and packets on the old path can arrive later than packets on the new path.

Partial Per-Path Scoreboard

In some embodiments, PSN scoreboard is not stored or transmitted as a bitmap. A per-path scoreboard may not be used in all cases and may sometimes result in unneeded retransmission, in cases where both data and acks have multiple drops. Various embodiments track a number (e.g., 3) of ranges of PSNs that were not received. Ranges can be consolidated (e.g., A . . . B and C . . . D become A . . . D) and if so, an "overflow" flag can indicate that some intermediate values in the range were actually received. Use of an overflow range may result in unnecessary retransmission of some packets that were already received, but all missing packets can be included in some range. Hence forward progress is assured so long as packets have a non-zero chance of getting through on some path.

When a gap is first seen, a most recent gap range could be stored exactly, not merged with any other and a selective ack can be sent immediately. The selective ack can report that gap (and whatever else is in the path scoreboard). A sender can receive an exact report of the gap, if no ack packets are lost.

ACK Packets

An ACK packet can be transported in an RL packet that carries an ACK (or SACK) optional header. ACK/SACK optional headers can include the Path ID being acknowledged, with the highest PSN received, and for a selective ack, a copy of the per-path partial scoreboard (e.g., 3 ranges, with overflow flags). An ACK packet can carry an acknowledgement of the highest PSN seen on each path by a receiver. For a "selective" ack that requests retransmission of packets associated with some PSNs, the ACK header can list the ack excluded ranges. An ACK can be transmitted in a flush packet that carries no data, if no data packet is available for piggybacking or if piggybacking is not desired.

An ACK packet may be sent on any path used by the reverse direction, without restriction. Hence it is possible for ACKs to be reordered, due to variable latency on different paths. Because RL uses excluded ranges, not a go-back-N protocol, ACK order need not be maintained.

Pseudocode for adding an ACK block to a data or flush packet, and for sending an immediate ACK, which can be generated using a FLUSH packet carrying an ACK, is shown below. Note that there is a procedure CompressAckExcludedRanges for reducing the number of excluded ranges stored at the receiver, to reduce connection state.

```
procedure AddAcksToPacket(pkt) = {
    optionally do
        CompressAckExcludedRanges( ); // optional, not recommended
    pkt.opcode := pkt.opcode + "+ACK";
    pkt.acks := rx.PSN;
    pkt.AERs := rx.AERs;
    rx.ack_timer.clear( );
    optionally do
```

-continued

```
    CompressAckExcludedRanges( ); // recommended
}
procedure TransmitImmediateAck = {
    CreateFlushPacket(pkt);
    AddAcksToPacket(pkt);
    pkt.PRIORITY := true; // we wish to avoid dropping immediate acks
    Send(pkt)
}
```

Pseudocode for handling Ack Excluded Ranges (AERs) in the receiver is as follows. The parameter numCompressedAERs is implementation dependent and the recommended value is at least 2, to allow for multiple ACK drops or ACK reorderings but still request retransmission of exactly the packets that were not received.

```
procedure AddAckExcludedRange(path,lo,hi) = {
    rx.AERs[path] := {[lo,hi],rx.AERs[path]}; // push excluded range at head of fifo (i.e. at AERs[path][0])
}
procedure CompressAckExcludedRanges( ) = {
    for all p in 0..rx.maxPath do
        if (rx.AERs[p].length > numCompressedAERs) then
            rx.AERs[p][numCompressedAERs-1].lo := rx.AERs[p][rx.AERs[p].length-1].lo;
            rx.AERs[p].length := numCompressedAERs;
}
procedure ClearOldAckExcludedRanges(path,psn_base) = {
    AERs := rx.AERs[path];
    for i := AERs.length-1 downto 0 do
        if (psn_base-AERs[i].hi >= 0) then
            AERs.length := i+1;       // discard excluded range from fifo
        else if (psn_base-AERs[i].lo >= 0) then
            AERs[i].lo := psn_base+1; // trim excluded range
    rx.AERs[path] := AERs;
}
```

If a change is in highest PSN received, a receiver can wait for a small, fixed time delay before sending an ACK, to see if further packets arrive on that path. If a gap appears (e.g., new PSN is not previous highest PSN+1), the receiver can send selective ack immediately (e.g., using a flush packet), so that retransmission by the sender can occur as soon as possible. ACKs for multiple paths may be sent in the same packet, as a chain of option headers. ACKS can be combined with data packets on the reverse connection. Some embodiments throttle overall ACK traffic to some maximum packet rate, to avoid overloading network switches.

When a normal ACK is received at a sender, the sender can advance the PSN base of each path to the PSN acknowledged (if higher than the previous base), and may clear the retransmission state for PSNs outside the window. When a selective ack is received, any part of the path scoreboard received that is outside the current path window can be discarded and any remaining gaps are looked up by PSN to obtain their retransmission state. The sender can enqueue missed packets for retransmission. The PSN base can be advanced to the last PSN acknowledged. The new PSN base can be reported to the receiver in the PSN_Base field of the next packet on that path, so that the receiver can stop reporting the missing packets.

In some examples, in certain cases where there are multiple losses of both data and ack packets, various embodiments revert to go-back-N behavior to cause re-transmission of an entire range of packets, without information about which packets were actually received. Retransmission can occur for packets from a single path, which may be a fraction of the link bandwidth (unless this scenario strikes on all paths at once).

Packets can be enqueued for retransmission in order of sequence number. Certain packets can be marked in their retransmission state for higher priority retransmission, and re-enqueued first for retransmission. This may be done, for instance, for packets carrying control tags that are used to interpret other packets in the data stream.

If a selective ACK includes an overflow range (e.g., a range A . . . B where the intermediate seq #s A+1 . . . B−1 may or may not have been received at the receiver), then there may have been more precise information sent in one or more previous selective ACKs but previous selective ACKs may have been lost, or may be delayed (because ACKs are not kept in order in the network) and will arrive later. The sender can delay retransmission of packets in the overflow range, to give time for other ACKs to arrive. The sender can track a single overflow range not yet retransmitted and a timer. Further selective ACKs that arrive before the timer expires may reduce the stored overflow range. Once the timer expires, packets in the stored overflow range can be retransmitted and the overflow range can be cleared. If an ACK with a new overflow range arrives, within the current path window and not overlapped with the old overflow range, the old range of packets can be retransmitted immediately and cleared.

Note that this mechanism reverts to go-back-N-like behavior (retransmission of an entire range of packets, without info about which of them were actually received) in certain cases where there are multiple losses of both data and ack packets. Even when this happens, the retransmission is for packets from a single path, which could be a fraction of the link bandwidth (unless this scenario strikes on all paths at once).

When packets are enqueued for retransmission, this could generally be done in order of sequence number. But, it is possible to mark certain packets in their retransmission state for higher priority retransmission, and if so these packets could be re-enqueued first. This may be done, for instance, for packets carrying control tags that are used to interpret other packets in the data stream.

Pseudocode for handling acknowledgements, and sending retransmissions if necessary.

```
procedure HandleAcks(pkt) = {
  if ~ValidateAcks(pkt) then stop;
  // retransmit lost packets from ack excluded ranges
  for [path,lo,hi] in pkt.AERs do
    for i in lo..hi do
      if (i-tx.PSN_Base[path] > 0) then
        RetransmitDataPacket(path,i);
  // clear resend buffer, update PSN_Base
  for path in 0..tx.maxPath do
    if (pkt.ack[path]-tx.PSN_Base[path] > 0) then
      for i in tx.PSN_Base[path]+1..pkt.ack[path] do
        SendCompletionToTL(tx.resend_buf{path,i}.TL_handle);
        tx.resend_buf{path,i}:= null;
    tx.PSN_Base[path] := pkt.ack[path];
}
procedure RetransmitDataPacket(path,PSN) = {
  {pkt.payload,pkt.GSN,TL_handle,retry_count}:= tx.resend_buf{path,PSN};
  // TBD: if retry_count is excessive, punt to control plane
  pkt.opcode := DATA;
  pkt.PRIORITY := true; //try to avoid retransmitting twice
  if (rx.ack_timer.piggybackAcks( )) then AddAcksToPacket(pkt);
  SetPathAndPsn(pkt);
  // save for possible re-retransmission, under new PSN
  tx.resend_buf{pkt.path,pkt.PSN} := {pkt.payload,pkt.GSN,TL_handle,retry_count+1};
  Send(pkt)
}
```

Zombie ACKs

A sender can validate received ACKs, even when piggybacked on otherwise-valid packets. For example, if an Ack Sequence Number (ASN) is more than 32K older than highest ASN seen, the ACK can be ignored ack as a zombie ACK. If the ACK is for a PSN in the future, the ACK can be ignored and treated as a Zombie ACK.

A Zombie ACK can be an acknowledgement that has been sent on a slow return path, such that by the time the ACK arrives, one of the PSNs it is acknowledging has rolled over. A 32b Ack Sequence Number (ASN) can be included with every ACK packet. For the GSN, it is assumed that a 32b number will not roll over before old packets are timed out of the network. The ASN can be defined as one 32b value per RLC (per direction). A receiver can generate the ASN, and the ASN can be incremented whenever any PSN it receives gets incremented. For example, an ASN can equal an sum of the PSNs on all paths, plus 2^16 times the number of times any PSN received has rolled over.

The sender can tracks a highest ASN value received thus far, and ignore any zombie ACKs that come with an ASN that is more than 32K, or other value, out of order. When a PSN advances by 32K or more, thus appearing to have rolled over and potentially becoming a zombie ACK, the ASN is guaranteed to have advanced at least that fare as well and the ACK can be discarded. For an idle connection, a top 16b of ASN can be stored, since the bottom 16b can be inferred as the sum of PSNs.

Receiver Ack Timer

At the receiver, when a PSN advances, an ACK timer can be started. After a period defined by the parameter generateAckDelay, an ACK packet can be generated and sent, if the ACK has not already been piggybacked on another packet. This parameter can be set such that an ACK can be sent before the first sender flush timer expires. The piggybacking of ACKs on other packets can also be controlled by a parameter piggybackAckDelay. This parameter is implementation dependent and is permitted to be zero (making piggybackAcks( ) always true, if the timer is active) or to be a very large value (making piggybackAcks( ) always false).

Pseudocode for use of the ACK timer is shown here. The pseudocode uses the delta between the timer start and the current time, but this could of course be implemented with a counter.

```
object AckTimer = {
  time   startTime;
  boolean active := false;
  method clear( ) = {active := false}
  method start( ) = {if (~active) then {startTime := currentTime( ); active := true}}
  method generateAcks( )    : boolean = {return (active AND (currentTime( )-startTime) > generateAckDelay)}
  method piggybackAcks( ) : boolean = {return (active AND (currentTime( )-startTime) > piggybackAckDelay)}
}
```

Protocol State

Various elements of endpoint state used for this protocol are described below. A sender state can be tracked per connection and per path. A connection path can include: number of paths and path IDs of active paths, GSN window bounds (max distance in flight), maxPath (e.g., highest path ID in use), GSN to apply to next new packet, or highest Ack Sequence Number (ASN) received, to detect zombie acks.

A per path sender state can include one or more of the following.

| State | Example description |
| --- | --- |
| path_steering value | Path steering bits can be placed in UDP source port |
| PSN value | Path Sequence Number value |

-continued

| State | Example description |
| --- | --- |
| PSN_Base | Highest Path Sequence Number that has been returned in an ack |
| Weight | Proportion of bandwidth to be placed on this path (e.g., set by Congestion Control Sublayer) |
| Credit | Can be used for distributing bandwidth according to weight |
| Max_outstanding_packets | Maximum number of outstanding packets |

A sender can track Global Retransmission State, which can include resend buf and a map. The resend_buf can map from (RLC ID, path ID, PSN) to the original GSN and packet payload or to a "packet descriptor" allowing the payload to be re-fetched from the transport layer. The Map (e.g., a hash table) can map (connection, path id, PSN) to packet descriptor and GSN. This state can track all outstanding packets, for possible packet retransmission. A maximum number of outstanding packets scales with the sender bandwidth and the maximum RTT for retransmission. They can be stored in a single consolidated table for all connections, so that the size of the table need not scale with a number of connections. An implementation could include a multi-way cuckoo or d-left hash table, with a low probability of overflow into a CAM and/or a larger hash table in main memory.

Receiver State can be stored per connection and per path. Per Connection state can include GSN window bounds, bitmap of received GSNs, and ack_timer. A bitmap of received packets can be maintained exactly, in order to deliver every packet exactly once. But, the state used could still potentially be compressed for the typical case. Options can include having small and large scoreboard allocations, depending on the connection rate, or more generally, dynamically allocating slices of the bitmap. Such schemes can use a handshake between receiver and sender to adjust the maximum window size. An ack_timer can be a timer for sending acknowledgements The receiver can record per path state such as highest Path Sequence Number received; Ack Sequence Number generated to validate acks; or list of Ack Excluded Ranges such as ranges of PSNs not received (or at least partially not received), and packets requested to be retransmitted.

Control packets (with CTRL opcode) can be used for various cases of error handling, corner-case handling, or re-negotiation (such as changing the number of paths used, or the GSN window). They can be terminated by the control plane of the receiving RL endpoint. Control packets can originate in the control plane of the RL sender, but they may in some cases be generated directly by the data plane. The specific message of a control packet is carried in the RL payload.

Control payload formats can be developed for different cases. There can be an extension format to allow for arbitrary messages between the control endpoints. Control packets can be delivered in a best-effort manner, directly to the control layer of the receiver, and may not participate in the PSN/GSN reliability mechanism. Reliability, when needed, can be handled by an exchange of control packets. Control messages may be used for error handling, when it is known or suspected that there is already a failure in the PSN/GSN mechanism and allows for recovery from arbitrary failure conditions. Control packets may use the normal path selection mechanism on transmit; or the control plane may fully specify the path descriptor (without limiting it to paths currently in use by an RLC), or even fully specify all transmitted packet headers.

Path Creation and Shutdown

When all sent packets on a path have been acknowledged, a sender can shut down a path. The sender can then restart a path at any time, with same or new path steering and PSN does not reset. Packet loss on a path can be detected (e.g., by N unacked flush packets), and then the path can be shut down and all unacked data packets on that path retransmitted on other paths.

Congestion Control Sublayer

In some examples, a Congestion Control Sublayer (CCS) can provide at least the following services: (1) Rate Control to adjust a maximum transmission rate and transmission window per path; (2) Path Selection to set a path steering bits for a newly-established path; or (3) Path Establishment and Shutdown to determine when to add new paths to a multipath connection, or to shut down a path. A CCS can be notified at least of the following events, at minimum: (a) Backward explicit congestion notification (BECN), packet drops and retransmission, or packet acknowledgement. Other information can be received by the CCS such as: high-precision ECN (e.g., more than 1b per packet to indicate congestion level); switch-based hints (e.g., notifications directly from network switches (switch to sender, not following the FECN/BECN path through receiver) of congestion or packet drops); under-utilization (e.g., measurements of available excess network capacity); precise timing (e.g., nanosecond-level timers for packet latency; topology (e.g., knowledge of the overall network topology, or of the network paths produced by particular path-steering bits); transport-level hints (e.g., awareness of upcoming traffic patterns, such as incast, arising from the transport layer); or global view (e.g., per-node accumulation of congestion data, or per-system data from a central coordinator). To support flexibility, packet data for CCS's use can be generally encoded in optional headers in the RL protocol.

Rate Control

An aspect of RTA congestion control is that the sending rates on different paths of the same connection are adjusted independently. When some paths are congested due to traffic collisions, traffic can be moved away from those paths and onto other paths of the same connection. Note that in some cases, such as incast, all paths of a connection can share the same bottleneck and independent rate adjustment will not help. In such cases, all paths are expected to receive congestion signals and can reduce rate accordingly. In CCS instances making use of switch-based hints and topology information, there may be explicit notifications of congestion on a link that can be applied to all paths traversing that link.

A CCS can control two separate but related limits on the rate of transmission over a given path. The first is the maximum number of bytes per second that can be transmitted, as limited by a leaky-bucket or dual-leaky-bucket scheme. The second is the number of bytes in flight, that is transmitted but not yet acked or nacked.

One of the difficulties with FECN/BECN based congestion control is that congestion is reported along the forward FECN path to the receiver before being reflected potentially using a same path that is suffering congestion. Thus the FECN messages are delayed, and there is a longer latency before the sender can learn of the congestion and react to it. If the sender continues transmitting at the same rate until it receives a BECN message, this can cause the sender to overfill the path with data, thereby worsening the congestion. For both rate measures, a total number of bytes consumed on the link could be counted (e.g., complete Ethernet frame, including headers, plus minimum average 12B inter-frame gap). The number of bytes per frame may be measured at the transmitter, or if the headers can be increased in flight, the frame length at the point of congestion may be estimated.

Various baseline congestion management schemes can be used. CCS-HP (High Precision) can use congestion tracking information returned from CCS-HP-capable switches for rate control. CCS-LP (Low Precision) can be updated for multipath and best-effort networks and works with switches supporting standard ECN marking or RED. Note that the similar rate control of CCS-LP and DCQCN does not mean that RL with CCS-LP would use go-back-N or PFC, as DCQCN utilizes. RL can achieve reliable delivery from the selective-ack and retransmission mechanisms of MRS.

CC S-HP can find the most congested link, based on detailed link-by-link feedback from the switches, and at that link, estimate the amount that the in-flight window could be reduced by to bring the queue to zero. If all links on the path are underutilized, it instead gives a multiplicative increase to the rate and window, again based on detailed switch feedback, to fully utilize the bottleneck link. Hence, unlike TCP, CCS-HP scheme can quickly converge to fully utilizing the bottleneck links without having to hunt for the correct rate. A fully utilized link can be defined by a parameter η slightly less than 1 (e.g., 98%) which is the target link utilization, allowing for slight traffic variations.

For fairness, CCS-HP can use a small additive increase, which combines with multiplicative decrease to gradually bring flows to a fair allotment (as with TCP). The intent is to converge to full network utilization first, then fairness as a secondary priority.

CCS-HP can use INT (In-band Network Telemetry) to extract per-hop information from the switches along the path such as, e.g., queue length, bytes transmitted, timestamp, and link speed. CC S-HP can use a compressed format to derive the same information in a more efficient manner.

A multiplicative decrease (or increase, if <1) is estimated as the maximum value of $k_j$ over all links j in the path, where $$k_j = \eta \times ((qlen_j/(B_j \times T)) \times (txRate_j/B_j))$$

where

T is the base RTT;

Bj is the bandwidth of link j (or the available bandwidth for RTA traffic at the current QoS level)).

Note that T is needed as a scaling parameter to combine qlen and txRate, in order to calculate k and to compare values of k to find the maximum value. A forward-going congestion header can carry a single value of k. Each switch can calculate its local value of $k_j$ for its outgoing link j, and overwrite the previous value in the forward-going congestion header if its value is larger. The sending NIC can initialize the value as 0.

In CCS-HP, the txRate can be estimated directly by a switch and may be calculated as an average rate over the most recent RTT period, or as an EWMA with time constant of roughly 1 RTT. The qlen calculated by the switch could be a minimum queue length seen over the most recent ~1 RTT period, to filter out noise in qlen and may be sampled at either packet arrival or packet departure times. The periods over which average txRate and min qlen are calculated may be somewhat coarse-grained, e.g., non-overlapping tracking periods of 0.5-1 RTT.

The CCS-HP scheme can achieve fast convergence to maximize bandwidth without congestion, followed by slow convergence to fairness. The fairness convergence is controlled by an additive increase parameter $W_{AI}$, a rate increase applied to every flow.

Various embodiments of CCS-HP can modify the definition of $W_{AI}$. Instead of a fixed parameter applied per path, the parameter $W_{AI\_RLC}$ is applied per RLC, and each path will get an additive increase corresponding to its share of bandwidth. In some examples, $W_{AI}$ can be represented as:

$$W_{AI} = W_{AI\_RLC} * R_p/R$$

where $R_p$ is the rate on path p, and

R is the total rate across all paths in the RLC.

Fairness between RLCs with same congestion can be achieved so that if two RLCs are suffering the same congestion on all their paths (as they would in, for instance, an incast to the same receiver), then they can converge to the same total rate. In equilibrium, in the fluid model, the multiplicative decrease (by the same factor, for all paths of both RLCs) must equal the additive increase (which has the same total for each RLC).

Various embodiments can move traffic to less-congested paths of an RLC. At equilibrium, an additive increase and multiplicative decrease must cancel out for each path in an RLC. But since the additive increase WAT is proportional to path bandwidth, the multiplicative decrease amount must be also, and hence the decrease factor is the same across all paths—meaning all paths of the RLC are equally congested. If this is not the case, then less-congested paths can increase bandwidth relative to more-congested paths until equilibrium is reached. Note that the convergence process may reduce some paths through congested links to zero bandwidth, at which point they can be ignored, closed down, or replaced with different path choices.

Additive increase parameter $W_{AI\_RLC}$ can control the tradeoff between the speed of convergence to fairness and the maximum number of concurrent connections that can be made while maintaining near-zero queues. The goal is that the total additive increase per round may not exceed the bandwidth headroom established by the parameter η, and hence no queue will form. In some examples, $W_{AI\_RLC} = B_{CS} * (1-\eta)/N$, where $B_{CS}$ is the cross-sectional bandwidth of the network and N is the expected maximum number of concurrent RLCs.

If the total number of concurrent connections exceeds N, or if due to uneven path selection a large set of connections is concentrated onto one or more links, the additive increase on a link may exceed the headroom. In this case, the congestion control will still be stable and achieve full utilization, but it can be unable to maintain zero queues. If needed, a global monitoring process could be used to track the total number of concurrent RLCs in a system, and readjust $W_{AI\_RLC}$ accordingly. This can be a slow update cycle, and does not need to be perfectly synchronized across all senders, as it affects the slow convergence to fairness.

For a CCS-LP scheme, DCQCN rate control scheme can be used independently on every path. A transmission window may also be defined per path, where the window matches the rate for some base RTT (statically defined, or measured by EWMA).

In the baseline case, for either CCS-HP or CCS-LP, new paths can be chosen randomly. That is, the path steering bits can be a pseudo-random number, assigned at path creation such as when CCS does not have access to topology information. Some paths, by chance, may be poor choices due to contention on a heavily-used switch or link. The baseline scheme will have mechanisms to shut down poorly-performing paths and replace them with others, as described below.

The number of paths in use for a given connection can vary depending on the bandwidth. A very low bandwidth connection may use a single path, thereby avoiding (almost all) packet reordering. However, if that single path experiences congestion, it is valuable to have a second, possibly uncongested path available. High bandwidth connections could use as many paths as the implementation supports; in general the amount of bandwidth on any given path could be kept to a fraction of the typical link capacity.

Paths can be created one by one as averaged bandwidth warrants it, according to some tunable function and averaging interval or use as many paths as implementation (and available path-tracking resources) supports.

A maximum number of paths used per connection can be negotiable when the connection is established. It is suggested that implementations could support up to 4 to 8 paths. A NIC with N uplink ports (for example, a 400G-capable NIC that can be partitioned to N=8 separate 50G uplinks) could support at least N paths, so that a bulk flow can be spread across all of them.

To support flexibility, packet data for CCS's use can be encoded in optional headers in the RL protocol.

Various embodiments provide for flow differentiation. Software and NIC guided differentiation of flows at the edge, extended TCs and/or packet queuing at the switch based on packet level fields/markers, supporting mechanisms in NICs and switches for buffer management and priority scheduling.

Flow differentiation can provide differentiation of flows to help NIC and switches to modify dynamic buffer allocation and scheduling according to the type of flow. The flow differentiation can occur either within the switch or at the NIC. Various embodiments can differentiate flows at the NIC level and let the switch do the necessary buffering and queuing as dictated by the NIC. The switch can choose to run their own heuristics to determine and differentiate between elephant and mice flows, however, there may be a potential state explosion and latency involved in the reaction time. On a per packet basis, queuing hints can be provided by the NIC to the switches and the switches can use those as a mechanism to guide buffer allocation and packet scheduling.

At the NIC level, in general there are at least three schemes for flow differentiation. An API can be provided to applications or any layer above the transport layer to mark flows based on knowledge of the type of flow and its latency and bandwidth needs. A NIC can support different communication models such as traditional LAN traffic, RDMA, NVMe, HPC-centric communication or AI-centric communication can mark flows according to the IP or software that is executed in the NIC. Different transport layers running over the reliable layer can choose the send the appropriate information down to the reliability layer to mark its flows. Each of the TL supported over RL may have additional criteria to differentiate elephant flow vs mice flows Transport layers on the NICs or switches could count the bytes per flow (for a practical number of flows) and if the byte count exceeds a threshold within a time window, the flow may be classified as a latency tolerant flow (e.g., an elephant flow).

According to various embodiments, the transport layer can pass on appropriate flags to the reliability layer and the reliability layer can format the appropriate queuing hints in the frame formats.

In addition to taking advantage of existing standard TCs, or extended TCs and/or queuing structure with additional fields in packet headers, fields can be used to tag different flows and guide buffer allocation and scheduling policies in both NICs and switches. Flow differentiation can be end-to-end.

A switch can respond to differentiation through separation of buffers for differentiated flows, minimizing buffers for elephant flows and adjusting scheduler priorities. In addition, the markers can also indicate priority of packet queuing for example queue first N packet of message in high priority queues and subsequent ones in low priority queues. A cutoff point between high and low priority queuing can be determined by the NIC transport layer based on its workload (and the software infrastructure).

NIC transmit queuing and QoS controls can respond to flow differentiation through adjusting transmit queuing for differentiated flows or adjusting transmit queue scheduler.

Fast-path Congestion Hints (FCH) can be sent from a NIC or switch. FCHs can include congestion notifications that can be generated at the point of congestion and directly sent back to the source with higher priority and greater reliability compared to general network traffic. Traditional congestion notifications are propagated to the destination and then returned to the source. FCHs include additional fields to guide the sources reaction to congestion. The ordering sub-layer may use the same mechanism when indicating congestion at its end. The response to the FCH generated from the ordering sub-layer as opposed to the switch may differ.

Various embodiments of congestion hints can include congestion notifications used in DCTCP or DCQCN. In DCTCP, when congestion is encountered, packets can be marked in the appropriate field and propagated to the destination as usual. The destination echoes the congestion information back to the source by marking returning acknowledgements. The source takes appropriate action such as invoking a rate-throttling approach to slow down the flow corresponding to the marked packet. In DCQCN, an explicit congestion notification packet is sent back to the source. The congestion notification packet may be sent from the destination or the switch depending on implementation. In the fast path, congestion avoidance mode the switch can send the congestion notification directly to the source. The following description is applicable for RT flows though some of the concepts can be broadly applicable as well. Some properties of the FCH are as follows.

An explicit FCH packet generation can occur at the switch to be sent directly to the source. FCH packet generation can be triggered by one or more of: (a) specific congestion thresholds are met or a source of the traffic explicitly adds a marker in the incoming packet to request the switch to generate the FCH. Some embodiments may modulate the rate of FCH generation. Not every packet in a newly identified congested flow uses a corresponding FCH. A switch could form an FCH packet and add the switch's current congestion levels. In order to periodically sample the states, the NIC can modulate the rate of such requests.

FCH packets can be configurable (e.g., statically or by flow differentiation) as high priority to minimize latency in the switch. FCH packets can be configurable (e.g., statically or by flow differentiation) as reliable whereby PCH packet loss due to congestion is not allowed.

An FCH packet may include fields to guide NIC decisions (e.g., load balance through multipathing or rate throttle). Rate throttling can be evenly distributed or bursty. Examples of the information contained in the FCH can include congestion state across configured ports in the switch. An FCH packet can include a full INT header and associated fields. In this mode of operation, that header could be created due to the request marker sent from the transmitter. The NIC can use that information to manage the congestion.

Fast-path packet drop hints (FPH) can provide early packet drop notification based on NIC-based markers for prioritized packets targeting reliable transport tail latency reduction. In some examples, as soon as a switch detects a congestion or queues that are getting close to be congested, besides marking the ECN field of a packet, the switch can format and form a message to be sent to the source NIC. This results in a smaller latency loop from a transmitter standpoint as the message is being received from an intermediate switch node rather than a far off receiver. As part of the message, the switch can send additional hints along with the packet that can aid the transmitting node to take fine grain actions. While creating the notification packet the header fields are copied from the incoming packet. The source and destination addresses can be swapped in the header. The source address can be replaced with the switch address so that the NIC's can identify where the packets originated.

A payload of the FPH packet can include hints associated with congestion markings, additional information such as request opcode and response status. Hints provided by the switch also include levels of congestion and indication of the history of congestion as seen over a period. In some examples, a NIC sends a request marker in a packet and based on the presence of the request marker, the switch take a snapshot of its congestion state and sends an FCH back to the requesting NIC with a congestion state.

In order to accelerate the detection of critical packet drops, the Reliable Transport Protocol may rely on hints from the switch. The trigger to generate such packets can be NIC driven in order to minimize the switch state. The NIC can mark packets that are critical and may use notification from the switch in the event of packet drops due to congestion. The switch can generate a fast-path hint back to the source indicating packet drops and any packet specific fields in the notification.

Switch actions can be taken based on NIC driven packet markers. For example, early packet drop identification and prioritized notification can take place. A notification can include a Path Sequence Number and a subset of the headers such as connection IDs. Notification can be prioritized for control packets, last packet in a message, and first packet of a message. Tail latency can be reduced, as RTOs for message completion are not used when a last packet of a message is dropped. Dropping the last packet of a message can result in triggering RTO and a longer tail latency. Accelerating notification of last packet drop can cut that time down to RTT of the network as the transmitter can take appropriate actions.

Switch actions taken based on NIC driven packet markers can include generate queue depths and sending queue depths to the NIC. For example, the NIC can maintain state and use it for adaptive routing/multipathing. If a queue depths exists by use of INT, the NIC can generate a marker that triggers a INT header generation back to the NIC. Adaptive routing over paths can take place based on queue depths. RT flows can periodically request a congestion notification status to keep track of the state at the NIC. Switch queue states can be used to guide multipathing and rate control decisions at the NIC transmitter.

System Level Congestion Management can provide for processing FCHs below the standard transport layer such as the reliability layer. The NIC can apply an approach to respond dynamically to congestion using a combination of load balancing and rate control techniques. Flows can be differentiated proactively before encountering any congestion. Differentiation may be introduced in many ways as described earlier. A generic flow chart describing the process is as shown below.

FCHs can be generated according to congestion detected in switches and based on NIC driven requests. NICs can respond to FCH information through load balancing and rate throttling decisions. FPHs can be generated at a switch in response to NIC driven markers. The NIC can respond with best effort to alleviate congestion. The transmitting NIC may not solely depends on the hints coming back from the switches alone to modify transmit rate.

A receiver NIC can perform various actions. The receiver NIC can process switch generated hint packets. Based on the amount of congestion detected on the path, the receiver NIC can set up and adjust QoS setting in the transmit schedulers.

A NIC transmitter can perform various actions based on receipt of an FCH. The NIC transmitter can pace traffic based on the new QoS setting. If a network path is heavily congested, back the transmission rate can be reduced based on the levels of congestion detected and sent by the switch. If an alternative path is available, the NIC transmitter can choose the alternate path.

A NIC transmitter can perform various actions based on receipt of an FPH. The NIC transmitter can re-transmit the critical packet that was dropped by the switch. Depending upon the congestion state, the re-transmission process may include traffic pacing and/or multipathing.

Figure 11:
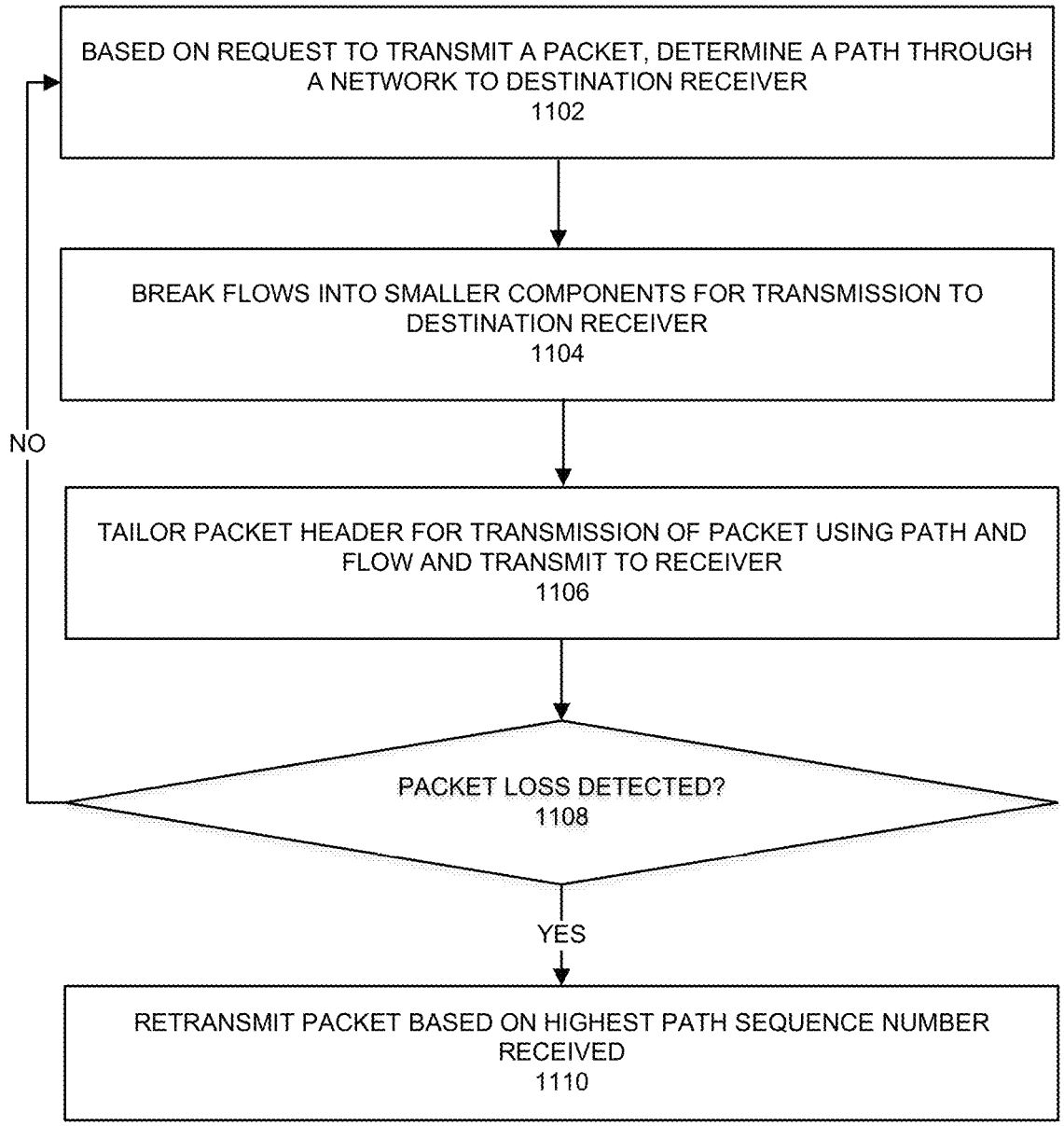
FIG. 11 depicts an example process to provide a reliable transport architecture by a transmitter of packets.

FIG. 11 depicts an example process to provide a reliable transport architecture by a transmitter of packets. The process can be performed by a network or fabric interface for example. In some embodiments, a switch or forwarding element can perform the process. At 1102, in response to a request to transmit a packet, a transmitter interface can determine a path through a network or fabric to destination receiver, at a sub-flow or per-packet granularity. A path can include a traversal through one or more network devices or elements (e.g., switches, routers) to an endpoint network interface device (e.g., NIC or switch).

At 1104, the transmitter interface can segment a flow of packets into smaller segments for transmission to a destination network device. For example the transmitter interface can segment a flow of packets for transmission using one or multiple paths. Various load balancing techniques described herein can be used to select one or more paths for packet traversal. A path can include one or multiple network elements (e.g., switch, router, network interface, and so forth) to an endpoint receiver network interface.

At 1106, the transmitter interface can generate a packet header for a packet for transmission using a selected path and chosen flow and transmit the packet to a receiver. The packet can have an assigned next Path Sequence Number (PSN) for that path, assigned next Global Sequence Number (GSN) for a new packet. The PSN can be a next sequential number to follow a PSN of an immediately previously transmitted packet on the same path. The GSN can be a next sequential value for all packets transmitted over a group of paths utilized by the transmitter interface to send packets. A per-Path Sequence Number in an RL header of a packet provides monotonically increasing sequence numbers for packets sent over a given path. In some cases, a re-transmitted packet can retain its GSN. The transmitter can record or store a GSN and a packet descriptor for the pair (path ID, PSN) to be used if a packet is to be retransmitted.

The receiving network interface can use a missing path-specific sequence number to detect path specific packet losses and issue selective ACKs or NACK as appropriate to indicate packet receipt and request packet re-transmission by a sender network interface. A receiving network interface can use a global sequence number in order to reorder traffic across multiple network paths.

At 1108, the transmitter network interface can determine if packet loss is detected. For example, packet loss can be detected via receipt of a selective acknowledge (ack) and indication of a highest received PSN from a receiver. If packet loss is detected, at 1110, the transmitter network interface can retransmit a packet based on highest Path Sequence Number received from a receiver so that any packet after the highest Path Sequence Number received is retransmitted. In some examples, a selective ack can indicate a range of one or more Path Sequence Numbers that were not received and are to be re-transmitted. The retransmitted packet can be sent using a different path than a prior path based on path selection in accordance with embodiments described herein. If packet loss is not detected (e.g., an acknowledgement of receipt is received by the transmitter for a transmitted packet), the process returns to 1102.

Figure 12:
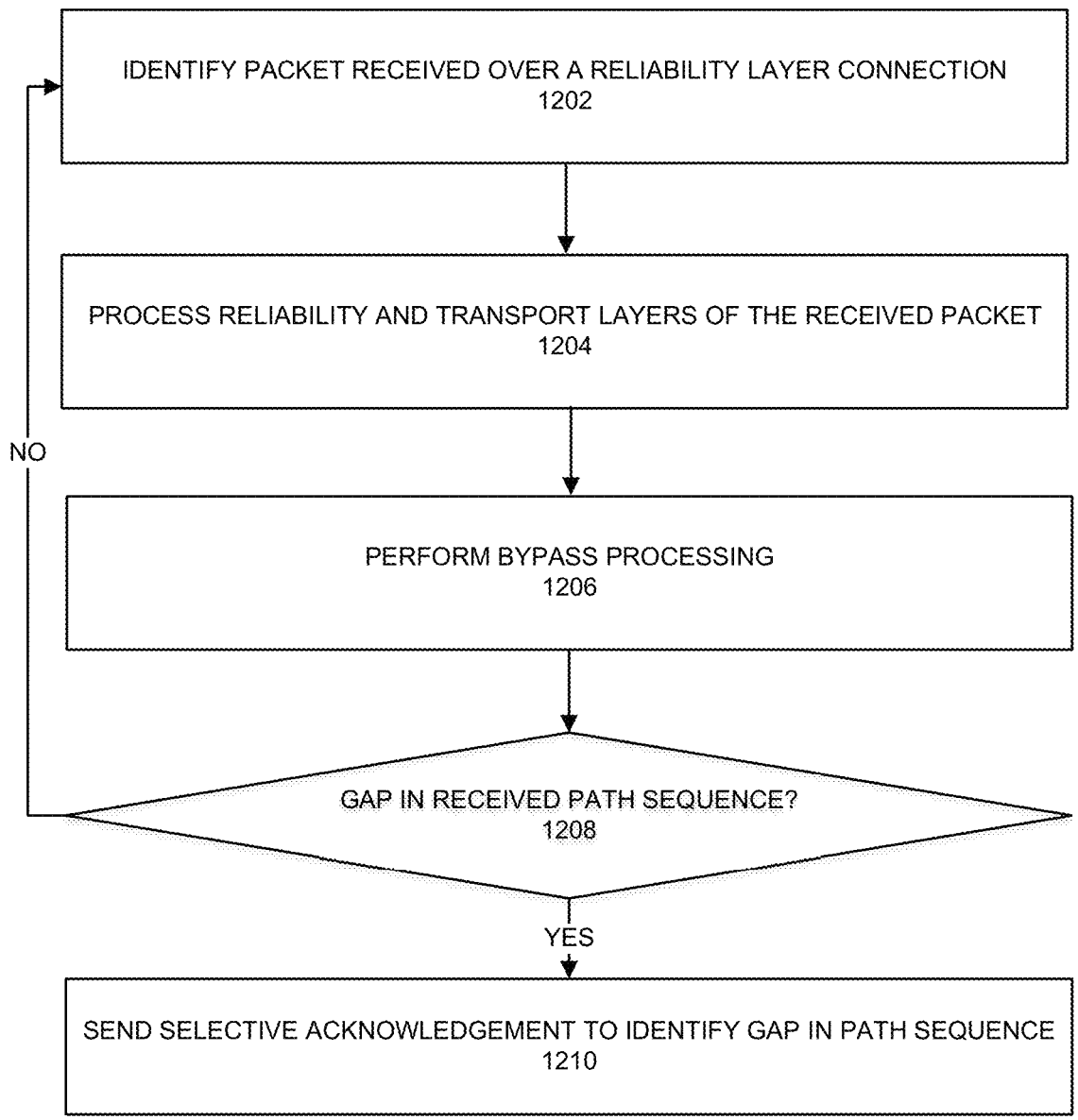
FIG. 12 depicts an example process to provide a reliable transport architecture for processing received packets.

FIG. 12 depicts an example process to provide a reliable transport architecture for processing received packets. The process can be performed by a receiver NIC in some examples. Multiple transport layer connections (TLC) can be multiplexed over a reliability layer connection (RLC) in a transmit direction or receive direction. A single RLC stream can be spread over multiple paths and transmitted. At 1202, identification can occur of a packet received using a reliability layer connection (RLC). For example, the received packet can be identified as using an RLC by one or more of: RL header, RL payload, RL CRC, Base Transport Header, Extended Transport Header, RDMA payload, MPI Transport Header, or MPI payload. The RL header can include one or more of: an OPCODE, RESERVED bits, PAD_SIZE, VERSION, RL Flags, HDR_SIZE, PSN, PSN_BASE, GSN, SRC_RLC, NEXT_HDR, DST_RLC, Optional Headers, or RL Header Checksum.

At 1204, processing of RL and TL of the received packet can occur. RL processing can be packet-oriented and may not provide message fragmentation or reassembly. RL processing may not be aware of TL operation semantics and visibility of the packet streams that result from these operations. RL processing may not distinguish TL requests and TL responses. RL processing may make no association between the incoming and outgoing packets that are part of the same TL operation. RL processing may be transparent to protocol deadlock avoidance.

TL processing can include RDMA PE mapping, storage transport layer processing, HPC/AI transport layer processing, or scale up transport layer processing.

At 1206, bypass processing can be performed of one or more TCP or UDP header component. For example, protocol processing in accordance with TCP or UDP protocol specification can be performed.

At 1208, a determination can be made as to whether a gap in Path Sequence Numbers is detected. For example, a determination can be made if an expected Path Sequence Number in the received packet is detected. For example, for a path, a highest Path sequence number received can be identified and if a received packet includes a Path Sequence Number that is not a next number after the highest Path Sequence Number received, a determination can be made that there is a gap in Path Sequence Numbers. If a determination is made of a gap in Path Sequence Numbers, then the process can proceed to 1210. If a determination is made of no gap in Path Sequence Numbers (e.g., received Path Sequence Numbers over a path are sequential), then the process proceeds to 1202 to prepare for a next received packet.

At 1210, a receiver can send a selective acknowledgement in response to a gap in Path Sequence Numbers. For example, based on detection of a gap in Path Sequence Numbers, a selective ACK can be transmitted by the receiver to the transmitter of packets from which Path Sequence Numbers have not been received. The receiver can inform the transmitter of a highest Path Sequence Number received in some examples. In some examples, RL communications can piggy-back RL ACKs onto TL packets in the reverse direction on the same Reliability Layer Connection. The transmitter can inform the receiver when selective ack has been received and processed, by updating a PSN window base. In response, the transmitter can retransmit one or more packets with Path Sequence Numbers that are immediately after the highest Path Sequence Number received.

Figure 13:
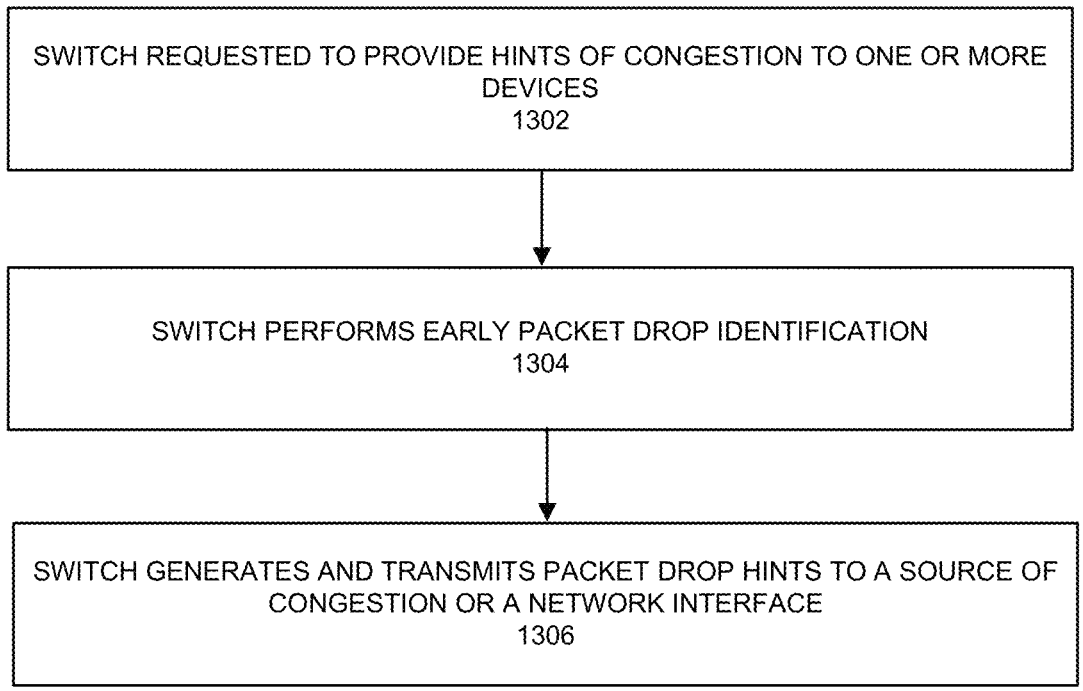
FIG. 13 depicts an example process to detect congestion and adjust traffic path based on congestion.

FIG. 13 depicts an example process to detect congestion and adjust traffic path based on congestion. A switch in a network, data center, or fabric can monitor for sources of congestion and information a source of congestion or a network interface transmitter of early signs of congestion. At 1302, a network interface can request a switch to provide hints based on detection of critical packet drops due to congestion. In some examples, a critical packet can be identified by a transmitting network interface controller using a flow identifier in its header such as an n-tuple described herein.

At 1304, a switch receives network interface driven packet markers and the switch can perform early packet drop identification. The switch can prioritize notification of critical packet drop. In some examples, the switch can provide one or more of its queue depths to the transmitting network interface, where the one or more queue depths correspond to a queue that stores or could store critical packets.

At 1306, a switch can generate and transmit fast-path packet drop hints (FPH) to a source of congestion. An FPH can include an early packet drop notification based on network interface-based markers for prioritized packets targeting reliable transport tail latency reduction. The FPH can indicate packet drops and packet specific fields. In some examples, the network interface that requested hints is the source of congestion and causes reduce transmission rate of the critical packets or other packets that could contribute to drops of critical packets. In some examples, the network interface that requested hints is not the source of congestion. A transmitter network interface can receive FPH and track and compare congestion on multiple paths and can move transmitted traffic from congested to uncongested paths.

Figure 14:
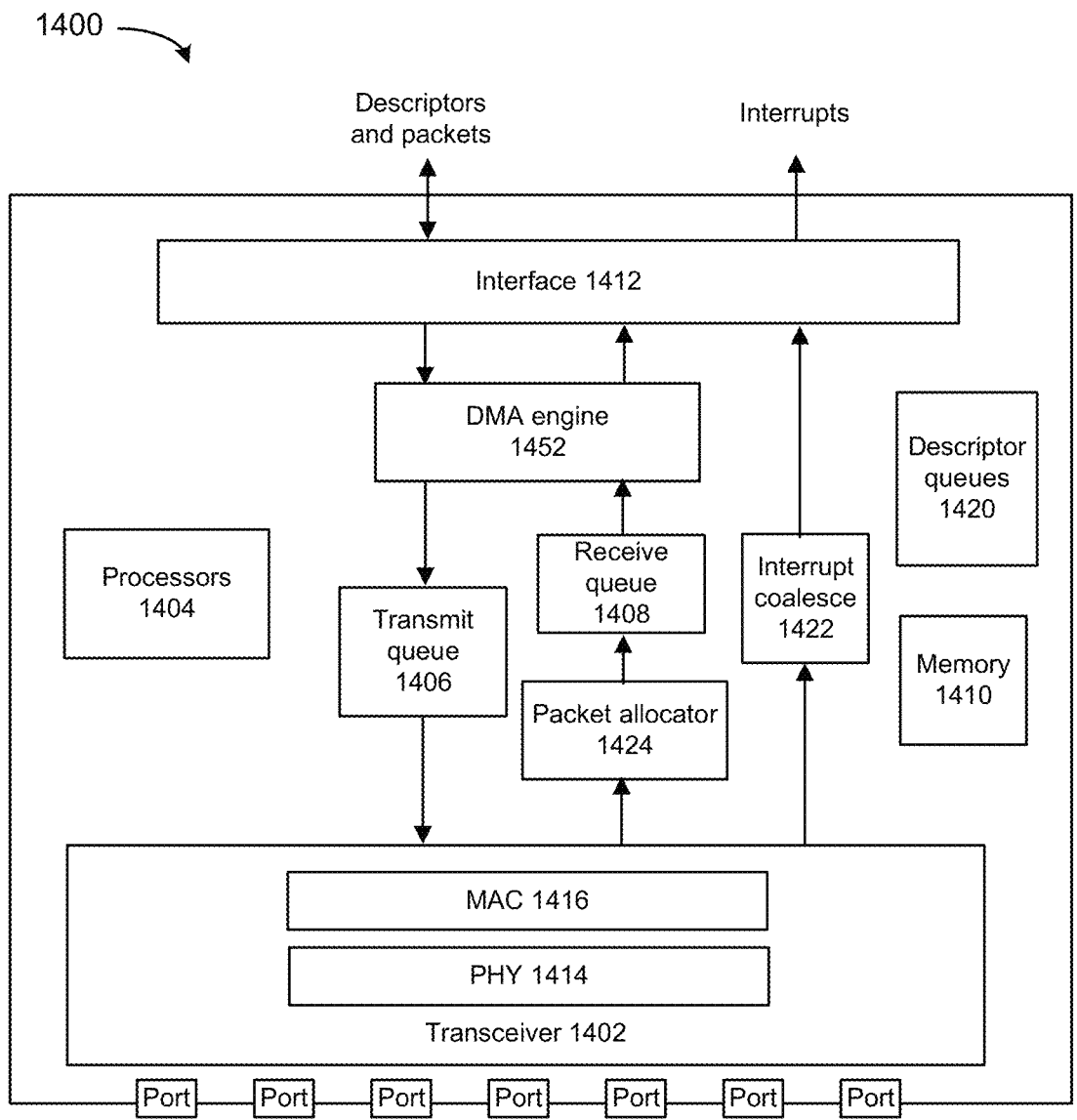
FIG. 14 depicts an example network interface.

FIG. 14 depicts an example network interface. Various embodiments can use the network interface as an interface with a network, fabric, or interconnect. Various embodiments can be used as part of a switch. Various embodiments of the network interface can be used as a transmitter or receiver NIC that can be part of an RTA. In some examples, network interface 1400 can be implemented as a network interface controller, network interface card, a host fabric interface (HFI), or host bus adapter (HBA), and such examples can be interchangeable. Network interface 1400 can be coupled to one or more servers using a bus, PCIe, CXL, or DDR. Network interface 1400 may be embodied as part of a system-on-a-chip (SoC) that includes one or more processors, or included on a multichip package that also contains one or more processors.

Network interface 1400 can include transceiver 1402, processors 1404, transmit queue 1406, receive queue 1408, memory 1410, and bus interface 1412, and DMA engine 1452. Transceiver 1402 can be capable of receiving and transmitting packets in conformance with the applicable protocols such as Ethernet as described in IEEE 802.3, although other protocols may be used. Transceiver 1402 can receive and transmit packets from and to a network via a network medium (not depicted). Transceiver 1402 can include PHY circuitry 1414 and media access control (MAC) circuitry 1416. PHY circuitry 1414 can include encoding and decoding circuitry (not shown) to encode and decode data packets according to applicable physical layer specifications or standards. MAC circuitry 1416 can be configured to assemble data to be transmitted into packets, that include destination and source addresses along with network control information and error detection hash values. Processors 1404 can be any a combination of a: processor, core, graphics processing unit (GPU), field programmable gate array (FPGA), application specific integrated circuit (ASIC), or other programmable hardware device that allow programming of network interface 1400. For example, processors 1404 can perform a determination of whether a received packet can be stored in a buffer selected by network interface 1400. In some examples, processors 1404 can be configured to perform any transmit side operations of RTA or any receive side operations of RTA described herein. For example, a "smart network interface" can provide packet processing capabilities in the network interface using processors 1404.

Packet allocator 1424 can provide distribution of received packets for processing by multiple CPUs or cores using timeslot allocation described herein or RSS. When packet allocator 1424 uses RSS, packet allocator 1424 can calculate a hash or make another determination based on contents of a received packet to determine which CPU or core is to process a packet.

Interrupt coalesce 1422 can perform interrupt moderation whereby network interface interrupt coalesce 1422 waits for multiple packets to arrive, or for a time-out to expire, before generating an interrupt to host system to process received packet(s). Receive Segment Coalescing (RSC) can be performed by network interface 1400 whereby portions of incoming packets are combined into segments of a packet. Network interface 1400 provides this coalesced packet to an application.

Direct memory access (DMA) engine 1452 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 1410 can be any type of volatile or non-volatile memory device and can store any queue or instructions used to program network interface 1400. Transmit queue 1406 can include data or references to data for transmission by network interface. Receive queue 1408 can include data or references to data that was received by network interface from a network. Descriptor queues 1420 can include descriptors that reference data or packets in transmit queue 1406 or receive queue 1408 and corresponding destination memory regions. Bus interface 1412 can provide an interface with host device (not depicted). For example, bus interface 1412 can be compatible with PCI, PCI Express, PCI-x, Serial ATA, and/or USB compatible interface (although other interconnection standards may be used).

Figure 15:
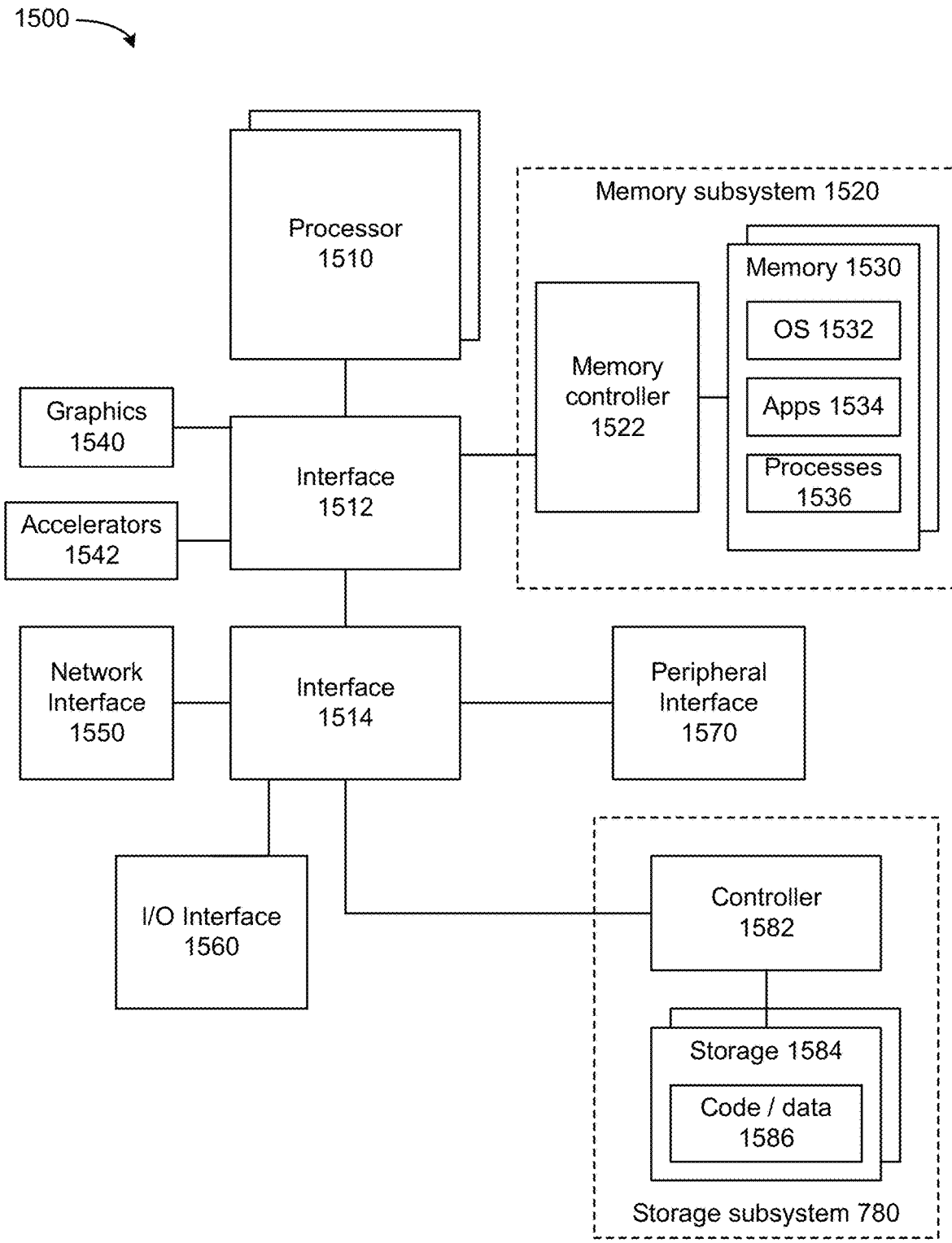
FIG. 15 depicts a system.

FIG. 15 depicts a system. The system can use embodiments described herein to transmit packets or receive packets using RTA in accordance with embodiments described herein. System 1500 includes processor 1510, which provides processing, operation management, and execution of instructions for system 1500. Processor 1510 can include any type of microprocessor, central processing unit (CPU), graphics processing unit (GPU), processing core, or other processing hardware to provide processing for system 1500, or a combination of processors. Processor 1510 controls the overall operation of system 1500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1500 includes interface 1512 coupled to processor 1510, which can represent a higher speed interface or a high throughput interface for system components that needs higher bandwidth connections, such as memory subsystem 1520 or graphics interface components 1540, or accelerators 1542. Interface 1512 represents an interface circuit, which can be a standalone component or integrated onto a processor die. Where present, graphics interface 1540 interfaces to graphics components for providing a visual display to a user of system 1500. In one example, graphics interface 1540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1540 generates a display based on data stored in memory 1530 or based on operations executed by processor 1510 or both. In one example, graphics interface 1540 generates a display based on data stored in memory 1530 or based on operations executed by processor 1510 or both.

Accelerators 1542 can be a programmable or fixed function offload engine that can be accessed or used by a processor 1510. For example, an accelerator among accelerators 1542 can provide compression (DC) capability, cryptography services such as public key encryption (PKE), cipher, hash/authentication capabilities, decryption, or other capabilities or services. In some embodiments, in addition or alternatively, an accelerator among accelerators 1542 provides field select controller capabilities as described herein. In some cases, accelerators 1542 can be integrated into a CPU socket (e.g., a connector to a motherboard or circuit board that includes a CPU and provides an electrical interface with the CPU). For example, accelerators 1542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1520 represents the main memory of system 1500 and provides storage for code to be executed by processor 1510, or data values to be used in executing a routine. Memory subsystem 1520 can include one or more memory devices 1530 such as read-only memory (ROM), flash memory, one or more varieties of random access memory (RAM) such as DRAM, or other memory devices, or a combination of such devices. Memory 1530 stores and hosts, among other things, operating system (OS) 1532 to provide a software platform for execution of instructions in system 1500. Additionally, applications 1534 can execute on the software platform of OS 1532 from memory 1530. Applications 1534 represent programs that have their own operational logic to perform execution of one or more functions. Processes 1536 represent agents or routines that provide auxiliary functions to OS 1532 or one or more applications 1534 or a combination. OS 1532, applications 1534, and processes 1536 provide software logic to provide functions for system 1500. In one example, memory subsystem 1520 includes memory controller 1522, which is a memory controller to generate and issue commands to memory 1530. It can be understood that memory controller 1522 could be a physical part of processor 1510 or a physical part of interface 1512. For example, memory controller 1522 can be an integrated memory controller, integrated onto a circuit with processor 1510.

In some examples, OS 1532 can determine a capability of a device associated with a device driver. For example, OS 1532 can receive an indication of a capability of a device (e.g., NIC 1550 or a storage configuration interface) to configure a NIC 1550 to utilize RTA or any embodiments described herein. OS 1532 can request a driver to enable or disable NIC 1550 to perform any of the capabilities described herein. In some examples, OS 1532, itself, can enable or disable NIC 1550 to perform any of the capabilities described herein. OS 1532 can provide requests (e.g., from an application or VM) to NIC 1550 to utilize one or more capabilities of NIC 1550. For example, any application can request use or non-use of any of capabilities described herein by NIC 1550.

While not specifically illustrated, it can be understood that system 1500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1500 includes interface 1514, which can be coupled to interface 1512. In one example, interface 1514 represents an interface circuit, which can include standalone components and integrated circuitry. In one example, multiple user interface components or peripheral components, or both, couple to interface 1514. Network interface 1550 provides system 1500 the ability to communicate with remote devices (e.g., servers or other computing devices) over one or more networks. Network interface 1550 can include an Ethernet adapter, wireless interconnection components, cellular network interconnection components, USB (universal serial bus), or other wired or wireless standards-based or proprietary interfaces. Network interface 1550 can transmit data to a device that is in the same data center or rack or a remote device, which can include sending data stored in memory. Network interface 1550 can receive data from a remote device, which can include storing received data into memory. Various embodiments can be used in connection with network interface 1550, processor 1510, and memory subsystem 1520.

In one example, system 1500 includes one or more input/output (I/O) interface(s) 1560. I/O interface 1560 can include one or more interface components through which a user interacts with system 1500 (e.g., audio, alphanumeric, tactile/touch, or other interfacing). Peripheral interface 1570 can include any hardware interface not specifically mentioned above. Peripherals refer generally to devices that connect dependently to system 1500. A dependent connection is one where system 1500 provides the software platform or hardware platform or both on which operation executes, and with which a user interacts.

In one example, system 1500 includes storage subsystem 1580 to store data in a nonvolatile manner. In one example, in certain system implementations, at least certain components of storage 1580 can overlap with components of memory subsystem 1520. Storage subsystem 1580 includes storage device(s) 1584, which can be or include any conventional medium for storing large amounts of data in a nonvolatile manner, such as one or more magnetic, solid state, or optical based disks, or a combination. Storage 1584 holds code or instructions and data 1586 in a persistent state (e.g., the value is retained despite interruption of power to system 1500). Storage 1584 can be generically considered to be a "memory," although memory 1530 is typically the executing or operating memory to provide instructions to processor 1510. Whereas storage 1584 is nonvolatile, memory 1530 can include volatile memory (e.g., the value or state of the data is indeterminate if power is interrupted to system 1500). In one example, storage subsystem 1580 includes controller 1582 to interface with storage 1584. In one example controller 1582 is a physical part of interface 1514 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In some embodiments, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1500. More specifically, power source typically interfaces to one or multiple power supplies in system 1500 to provide power to the components of system 1500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1500 can be implemented using interconnected compute sleds of processors, memories, storages, network interfaces, and other components. High speed interconnects can be used such as PCIe, Ethernet, or optical interconnects (or a combination thereof).

Any processor can use a shared resource environment. A shared resource environment can include a virtual machine or a container. A virtual machine can be software that runs an operating system and one or more applications. A virtual machine can be defined by specification, configuration files, virtual disk file, non-volatile random access memory (NVRAM) setting file, and the log file and is backed by the physical resources of a host computing platform. A container can be a software package of applications, configurations and dependencies so the applications run reliably on one computing environment to another. Containers can share an operating system installed on the server platform and run as isolated processes.

Any processor can use a shared resource environment. A shared resource environment can include a virtual machine or a container. A virtual machine can be software that runs an operating system and one or more applications. A virtual machine can be defined by specification, configuration files, virtual disk file, non-volatile random access memory (NVRAM) setting file, and the log file and is backed by the physical resources of a host computing platform. A container can be a software package of applications, configurations and dependencies so the applications run reliably on one computing environment to another. Containers can share an operating system installed on the server platform and run as isolated processes.

Figure 16:
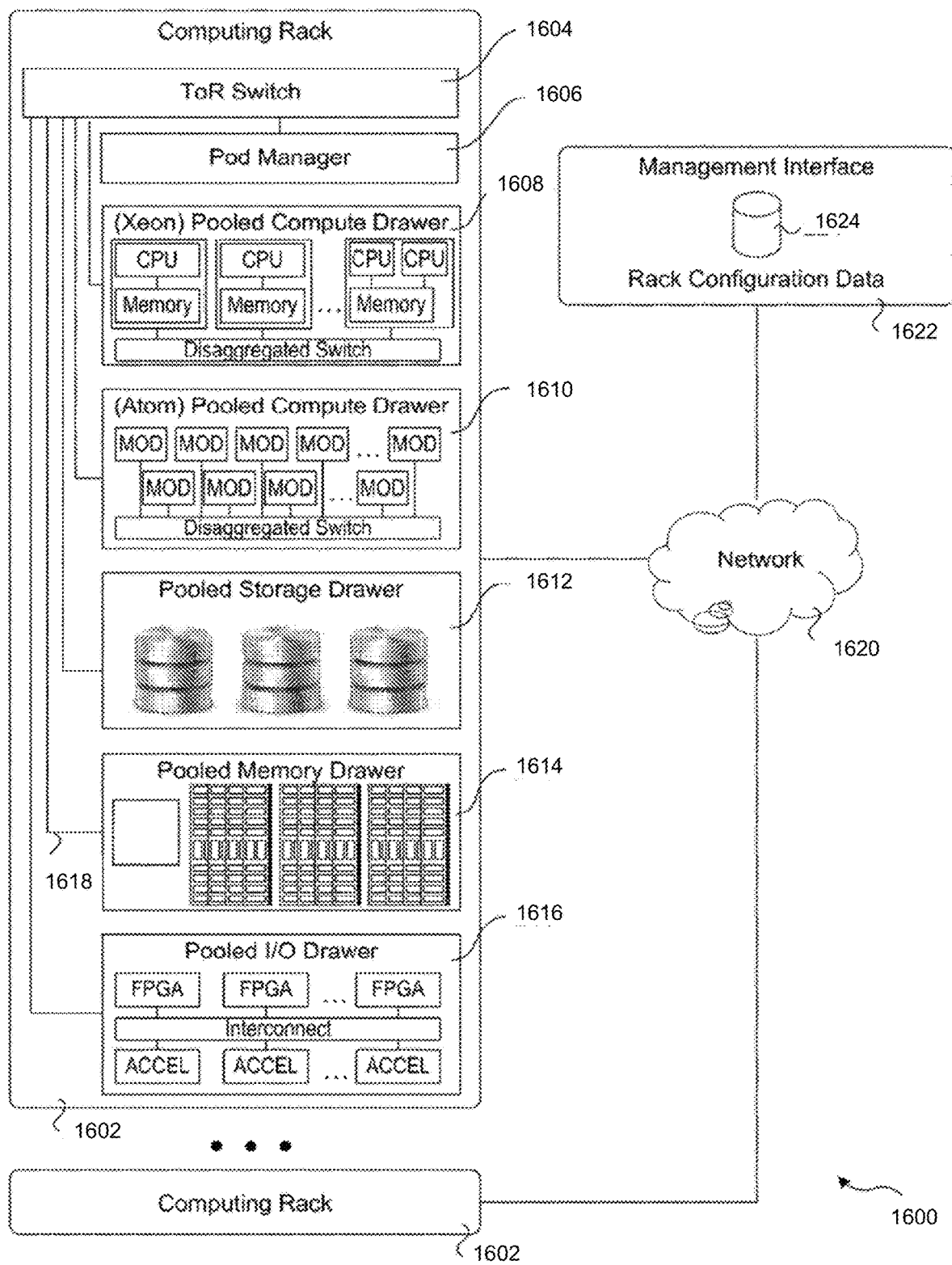
FIG. 16 depicts an example environment.

FIG. 16 depicts an environment 1600 includes multiple computing racks 1602, each including a Top of Rack (ToR) switch 1604, a pod manager 1606, and a plurality of pooled system drawers. The environment can use embodiments described herein transmit and receive packets using RTA embodiments described herein. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1608, and Intel® ATOM™ pooled compute drawer 1610, a pooled storage drawer 1612, a pooled memory drawer 1614, and a pooled I/O drawer 1616. Each of the pooled system drawers is connected to ToR switch 1604 via a high-speed link 1618, such as a 40 Gigabit/second (Gb/s) or 100 Gb/s Ethernet link or a 100+ Gb/s Silicon Photonics (SiPh) optical link. In some embodiments, high-speed link 1618 comprises an 800 Gb/s SiPh optical link.

Multiple of the computing racks 1602 may be interconnected via their ToR switches 1604 (e.g., to a pod-level switch or data center switch), as illustrated by connections to a network 1620. In some embodiments, groups of computing racks 1602 are managed as separate pods via pod manager(s) 1606. In some embodiments, a single pod manager is used to manage all of the racks in the pod. Alternatively, distributed pod managers may be used for pod management operations.

Environment 1600 further includes a management interface 1622 that is used to manage various aspects of the environment. This includes managing rack configuration, with corresponding parameters stored as rack configuration data 1624. Environment 1600 can be used for computing racks.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board. Various embodiments of RTA can be utilized by disaggregated servers connected by one or more switches, a network, or a fabric.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes any example and includes an apparatus comprising: a network interface comprising: a physical layer interface and circuitry coupled to the physical layer interface, the circuitry to: receive a request to transmit a packet to a destination device, select a path for the packet, provide a path identifier identifying one of multiple paths from the network interface to a destination and Path Sequence Number (PSN) for the packet, wherein the PSN is to identify a packet transmission order over the selected path, include the PSN in the packet, and transmit the packet.

Example 2 includes any example, wherein if the packet is a re-transmit of a previously transmitted packet, the circuitry is to: select a path for the re-transmit packet, and set a PSN of the re-transmit packet that is a current packet transmission number for the selected path for the re-transmit packet.

Example 3 includes any example, wherein the circuitry is to: select a path for the re-transmit packet based on a congestion level of one or more available paths and to load balance path utilization, wherein the selected path is a same path or different path than that used to send the previously transmitted packet.

Example 4 includes any example, wherein the circuitry is to: determine to re-transmit a packet based on receipt of a non-data packet or data packet from a receiver, wherein the non-data packet or data packet comprise an indication of highest PSN received before a detected gap in received PSN values.

Example 5 includes any example, wherein the circuitry is to: store data of a path identifier and PSN for the transmitted packet and update the data to indicate packets for which acknowledgement was received from a receiver.

Example 6 includes any example, wherein the circuitry is to: determine a global sequence number (GSN) of the packet, wherein the GSN is to identify a packet transmission order of the packet relative to previously all transmitted packets; include the GSN in the packet; and store data of the GSN and the path identifier and the PSN for the transmitted packet.

Example 7 includes any example, wherein the circuitry is to: request a switch to indicate congestion for one or more prioritized packet classes; process an indication of queue congestion for one or more prioritized packet classes; and modify one or more paths of packets in the one or more prioritized packet classes based on the indication of queue congestion for one or more prioritized packet classes.

Example 8 includes any example, wherein the circuitry is to: track and compare congestion on different paths to determine whether to move traffic from a congested path to an uncongested path.

Example 9 includes any example, include a server coupled to the circuitry, the server to provide data for transmission by the network interface controller.

Example 10 includes any example, and includes a network interface apparatus comprising: a physical layer interface and circuitry coupled to the physical layer interface, wherein the circuitry is to: process a received packet to at least determine a Path Sequence Number (PSN) for the received packet, wherein the PSN is to provide an order of packet transmissions for a path associated with the received packet, process a second received packet to at least determine its PSN, and based on the PSN of the second received packet not being a next sequential value after the PSN of the received packet, cause transmission of a re-transmit request to a sender of the packet and the second packet.

Example 11 includes any example, wherein the circuitry is to: cause transmission of an acknowledgement of receipt for the received packet, with a highest PSN received and a range of one or more PSN values to a sender of the received packet.

Example 12 includes any example, wherein the re-transmit request is provided in a data packet or a non-data packet.

Example 13 includes any example, comprising a server to process data from the received packet.

Example 14 includes any example, and includes a method comprising: at a network interface: receiving a request to transmit a packet to a destination device; selecting a path for the packet; providing a Path Sequence Number (PSN) for the packet, wherein the PSN is to provide a packet transmission number for the packet using the selected path; including the PSN in the packet; and transmitting the packet.

Example 15 includes any example, and includes: at the network interface: if the packet is a re-transmit of a previously transmitted packet: selecting a path for the re-transmit packet, and setting a PSN of the re-transmit packet that is a current packet transmission number for the selected path for the re-transmit packet.

Example 16 includes any example, and includes at the network interface: determining to re-transmit a packet based on receipt of a non-data packet or data packet from a receiver, wherein the non-data packet or data packet comprise an indication of highest PSN received before a detected gap in PSN values and a range of one or more PSN values.

Example 17 includes any example, and includes: at the network interface: storing data of a path identifier and PSN for the transmitted packet and updating the data to indicate packets for which acknowledgement was received from a receiver.

Example 18 includes any example, and includes a method comprising: at a network interface: processing a received packet to at least determine a Path Sequence Number (PSN) for the received packet, wherein the PSN is to provide an order of packet transmissions for a path associated with the received packet, processing a second received packet to at least determine a PSN, and based on the PSN of the second received packet not being a next sequential value after the PSN of the received packet, transmitting a re-transmit request to a sender of the packet and the second packet.

Example 19 includes any example, wherein the re-transmit request is provided in a data packet or a non-data packet.

Example 20 includes any example, and includes at the network interface: transmitting an acknowledgement of receipt for the received packet, with a highest PSN received and a range of one or more PSN values, to a sender of the received packet.

What is claimed is:

1. An apparatus comprising:
   an endpoint sender network interface comprising:
   a physical layer interface and
   circuitry coupled to the physical layer interface, the circuitry to:
   receive a request to transmit a packet to a destination device,
   select a path for the packet,
   provide a path identifier identifying one of multiple paths from the network interface to a destination and Path Sequence Number (PSN) for the packet in the selected path, wherein the PSN is to identify a packet transmission order over the selected path,
   include the PSN in a reliability layer (RL) header of the packet,
   determine a second sequence number of the packet, wherein the second sequence number is to identify a packet transmission order of the packet relative to previously transmitted packets over the multiple paths,
   include the second sequence number in the RL header of the packet,
   store data for the packet comprising: the second sequence number, the path identifier, and the PSN, and
   transmit the packet, wherein
      the packet is to include an Ethernet header, Internet Protocol (IP) header, transport layer header, and reliable transport packet,
      the reliable transport packet comprises the RL header and RL data integrity value,
      the RL header is separate from the transport layer header,
      the RL data integrity value comprises a cyclic redundancy check (CRC) value, and
      if the packet is a re-transmit of a previously transmitted packet, the circuitry is to:
         select a path for the re-transmit packet, and
         set a PSN of the re-transmit packet that is a current packet transmission number for the selected path for the re-transmit packet.

2. The apparatus of claim 1, wherein the circuitry is to:
   select a path for the re-transmit packet based on a congestion level of one or more available paths and to load balance path utilization, wherein the selected path is a same path or different path than that used to send the previously transmitted packet.

3. The apparatus of claim 1, wherein the circuitry is to:
   determine to re-transmit a packet based on receipt of a non-data packet or data packet from a receiver, wherein the non-data packet or data packet comprise an indication of highest PSN received before a detected gap in received PSN values.

4. The apparatus of claim 1, wherein the circuitry is to:
   store data of a path identifier and PSN for the transmitted packet and update the data to indicate packets for which acknowledgement was received from a receiver.

5. The apparatus of claim 1, wherein the circuitry is to:
   request a switch to indicate congestion for one or more prioritized packet classes;
   process an indication of queue congestion for one or more prioritized packet classes; and
   modify one or more paths of packets in the one or more prioritized packet classes based on the indication of queue congestion for one or more prioritized packet classes.

6. The apparatus of claim 1, wherein the circuitry is to:
   track and compare congestion on different paths to determine whether to move traffic from a congested path to an uncongested path.

7. The apparatus of claim 1, comprising a server coupled to the circuitry, the server to provide data for transmission by the network interface controller.

8. The apparatus of claim 1, wherein the transport layer header is consistent with User Datagram Protocol (UDP).

9. The apparatus of claim 1, wherein the reliable transport packet includes an opcode that is to identify reliable transport packet content and protocol version number.

10. A network interface apparatus comprising:
    a physical layer interface and
    circuitry coupled to the physical layer interface, wherein the circuitry is to:
    process a received packet to at least determine a Path Sequence Number (PSN) and a second sequence number of the received packet, wherein
       the PSN is to provide an order of packet transmissions for a path associated with the received packet,
       the received packet is to include an Ethernet header, Internet Protocol (IP) header, transport layer header, and reliable transport packet,
       the reliable transport packet comprises a reliability layer (RL) header and RL data integrity value,
       the RL header is separate from the transport layer header,
       the RL header includes the PSN,
       the RL data integrity value comprises a cyclic redundancy check (CRC) value,
       the second sequence number is to identify a packet transmission order of the received packet relative to packets previously transmitted over multiple paths;
    process a second received packet to at least determine its PSN,
    based on the PSN of the second received packet not being a next sequential value after the PSN of the received packet, cause transmission of a re-transmit request to a sender of the packet and the second packet; and
    based on a third received packet being a re-transmit of a previously transmitted packet, the re-transmit packet includes a PSN that is a then-current packet transmission number for a selected path for the re-transmit packet.

11. The apparatus of claim 10, wherein the circuitry is to:
    cause transmission of an acknowledgement of receipt for the received packet, with a highest PSN received and a range of PSN values to a sender of the received packet, wherein the range of PSN values comprises a starting PSN value and ending PSN value.

12. The apparatus of claim 10, wherein the re-transmit request is provided in a data packet or a non-data packet.

13. The apparatus of claim 10, comprising a server to process data from the received packet.

14. A method comprising:
at a network interface:
receiving a request to transmit a packet to a destination device;
selecting a path, among multiple paths, for the packet;
providing a Path Sequence Number (PSN) for the packet, wherein the PSN is to provide a packet transmission number for the packet using the selected path;
including the PSN in the packet;
including a second sequence number in the packet;
based on the packet comprising a re-transmit of a previously transmitted packet:
selecting a path for the re-transmit packet and setting a PSN of the re-transmit packet that is a current packet transmission number for the selected path for the re-transmit packet; and
transmitting the packet, wherein:
the packet includes an Ethernet header, Internet Protocol (IP) header, transport layer header, and reliable transport packet,
the reliable transport packet comprises a reliability layer (RL) header and RL data integrity value,
the RL header is separate from the transport layer header,
the RL header includes the PSN,
the second sequence number identifies a packet transmission order of a received packet relative to packets previously transmitted over the multiple paths, and
the RL data integrity value comprises a cyclic redundancy check (CRC) value.

15. The method of claim 14, comprising:
at the network interface:
determining to re-transmit a packet based on receipt of a non-data packet or data packet from a receiver, wherein the non-data packet or data packet comprise an indication of highest PSN received before a detected gap in PSN values and a range of PSN values, wherein the range of PSN values comprises a starting PSN value and ending PSN value.

16. The method of claim 14, comprising:
at the network interface:
storing data of a path identifier and PSN for the transmitted packet and
updating the data to indicate packets for which acknowledgement was received from a receiver.

17. A method comprising:
at a network interface:
processing a received packet to at least determine a Path Sequence Number (PSN) and second sequence number of the received packet, wherein
the PSN is to provide an order of packet transmissions for a path associated with the received packet,
the received packet is to include an Ethernet header, Internet Protocol (IP) header, transport layer header, and reliable transport packet,
the reliable transport packet comprises a reliability layer (RL) header and RL data integrity value,
the RL header is separate from the transport layer header,
the RL header includes the PSN,
the second sequence number identifies a packet transmission order of the packet relative to previously transmitted packets over multiple paths, and
the RL data integrity value comprises a cyclic redundancy check (CRC) value;
processing a second received packet to at least determine a PSN,
based on the PSN of the second received packet not being a next sequential value after the PSN of the received packet, transmitting a re-transmit request to a sender of the packet and the second packet; and
based on a third received packet being a re-transmit of a previously transmitted packet, the re-transmit packet includes a PSN that is a then-current packet transmission number for a selected path for the re-transmit packet.

18. The method of claim 17, wherein the re-transmit request is provided in a data packet or a non-data packet.

19. The method of claim 17, comprising:
at the network interface:
transmitting an acknowledgement of receipt for the received packet, with a highest PSN received and a range of PSN values, to a sender of the received packet, wherein the range of PSN values comprises a starting PSN value and ending PSN value.

* * * * *